United States Patent
Croxford

(10) Patent No.: US 10,223,764 B2
(45) Date of Patent: Mar. 5, 2019

(54) METHOD OF AND APPARATUS FOR PROCESSING A FRAME

(71) Applicant: ARM LIMITED, Cambridge, Cambridgeshire (GB)

(72) Inventor: Daren Croxford, Swaffham Prior (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/518,795

(22) PCT Filed: Oct. 16, 2015

(86) PCT No.: PCT/GB2015/053077
§ 371 (c)(1),
(2) Date: Apr. 13, 2017

(87) PCT Pub. No.: WO2016/059423
PCT Pub. Date: Apr. 21, 2016

(65) Prior Publication Data
US 2017/0243323 A1    Aug. 24, 2017

(30) Foreign Application Priority Data
Oct. 17, 2014 (GB) .................................. 1418495.6

(51) Int. Cl.
*G09G 5/39* (2006.01)
*G06T 1/60* (2006.01)
*H04N 13/106* (2018.01)

(52) U.S. Cl.
CPC .............. *G06T 1/60* (2013.01); *H04N 13/106* (2018.05)

(58) Field of Classification Search
CPC .................................. H04N 13/106; G06T 1/60
(Continued)

(56) References Cited

U.S. PATENT DOCUMENTS 8,988,443 B2    3/2015 Croxford et al.
9,406,155 B2    8/2016 Oterhals et al.
(Continued)

FOREIGN PATENT DOCUMENTS

WO    WO 2014/088707    6/2014

OTHER PUBLICATIONS

Banks, M. S., Read, J. C., Allison, R. S., & Watt, S. J. (2012), "Stereoscopy and the Human Visual System", SMPTE motion imaging journal, 121(4), pp. 24-43.*

(Continued)

*Primary Examiner* — Sarah Lhymn
(74) *Attorney, Agent, or Firm* — Nixon & Vanderhye P.C.

(57) ABSTRACT

A method of processing a frame in a data processing system is provided, in which the frame comprises one or more frame regions that together form the frame, and each frame region is represented as one or more data values, with each data value being represented by a set of data. The method comprises, for at least one region of the frame, when a memory access operation is to be performed for the region of the frame, comparing (163) a portion of the data representing data values for the frame region (165) with a corresponding portion of the data representing the corresponding data values for a previous frame region (162), which is a frame region for which the memory access operation has been performed, to determine if the portion of the data representing the data values for the frame region is similar to the corresponding portion of the data representing the data values for the previous frame region, wherein the portion of the data representing the data values for a frame region comprises a sub-set of controller data (167a, 167b) from each set of data representing a data value of the data values for the frame region. In an embodiment, if the portion of the data representing the data values for the frame region (Continued)

is determined to be similar to the corresponding portion of the data representing the data values for the previous frame region, the memory access operation is omitted, or, if the portion of the data representing the data values for the frame region is determined not to be similar to the corresponding portion of the data representing the data values for the previous frame region, the memory access operation is performed (169).

20 Claims, 18 Drawing Sheets

(58) Field of Classification Search
USPC .............................. 345/530, 531, 532, 533
See application file for complete search history.

(56) References Cited

U.S. PATENT DOCUMENTS

| 9,640,131 | B2 | 5/2017 | Croxford |
| 2008/0056606 | A1* | 3/2008 | Kilgore ................. F41G 7/2213 382/275 |
| 2010/0045782 | A1 | 2/2010 | Morita |
| 2011/0032984 | A1 | 2/2011 | Dorman et al. |
| 2011/0074765 | A1 | 3/2011 | Oterhals et al. |
| 2011/0080419 | A1 | 4/2011 | Croxford et al. |
| 2011/0102446 | A1 | 5/2011 | Oterhals et al. |
| 2012/0133660 | A1 | 5/2012 | Jang et al. |
| 2012/0176386 | A1 | 7/2012 | Hutchins |
| 2012/0268480 | A1 | 10/2012 | Cooksey et al. |
| 2013/0016898 | A1* | 1/2013 | Tchoukaleysky .. H04N 13/0066 382/154 |
| 2015/0278981 | A1* | 10/2015 | Akenine-Moller ....... G06T 1/20 345/522 |
| 2016/0021384 | A1 | 1/2016 | Croxford et al. |

OTHER PUBLICATIONS

International Preliminary Report on Patentability for PCT/US2015/053077 dated Apr. 27, 2017, 6 pages.
International Search Report and Written Opinion of the ISA for PCT/GB2015/053077, dated Jan. 27, 2016, 12 pages.
Combined Search and Examination Report for GB1418495.6, dated Apr. 17, 2015, 6 pages.
"Setting a New 3D Home Standard: Stereoscopic 3D", http://library/creativecow.net/schur ethan/magazine-3d-home/1 , 9 pages, retrieved Apr. 13, 2017.

* cited by examiner

610

| R[11:8] G[11:8] B[11:8] | R[11:8] G[11:8] B[11:8] | R[11:8] G[11:8] B[11:8] | R[11:8] G[11:8] B[11:8] |
|---|---|---|---|
| R[11:8] G[11:8] B[11:8] | R[11:8] G[11:8] B[11:8] | R[11:8] G[11:8] B[11:8] | R[11:8] G[11:8] B[11:8] |
| R[11:8] G[11:8] B[11:8] | R[11:8] G[11:8] B[11:8] | R[11:8] G[11:8] B[11:8] | R[11:8] G[11:8] B[11:8] |
| R[11:8] G[11:8] B[11:8] | R[11:8] G[11:8] B[11:8] | R[11:8] G[11:8] B[11:8] | R[11:8] G[11:8] B[11:8] |

Upper signature  0x12345678

620

| R[7:4] G[7:4] B[7:4] | R[7:4] G[7:4] B[7:4] | R[7:4] G[7:4] B[7:4] | R[7:4] G[7:4] B[7:4] |
|---|---|---|---|
| R[7:4] G[7:4] B[7:4] | R[7:4] G[7:4] B[7:4] | R[7:4] G[7:4] B[7:4] | R[7:4] G[7:4] B[7:4] |
| R[7:4] G[7:4] B[7:4] | R[7:4] G[7:4] B[7:4] | R[7:4] G[7:4] B[7:4] | R[7:4] G[7:4] B[7:4] |
| R[7:4] G[7:4] B[7:4] | R[7:4] G[7:4] B[7:4] | R[7:4] G[7:4] B[7:4] | R[7:4] G[7:4] B[7:4] |

Middle signature  0x12345678

630

| R[3:0] G[3:0] B[3:0] | R[3:0] G[3:0] B[3:0] | R[3:0] G[3:0] B[3:0] | R[3:0] G[3:0] B[3:0] | ~650 |
|---|---|---|---|---|
| R[3:0] G[3:0] B[3:0] | R[3:0] G[3:0] B[3:0] | R[3:0] G[3:0] B[3:0] | R[3:0] G[3:0] B[3:0] | ←640 |
| R[3:0] G[3:0] B[3:0] | R[3:0] G[3:0] B[3:0] | R[3:0] G[3:0] B[3:0] | R[3:0] G[3:0] B[3:0] | |
| R[3:0] G[3:0] B[3:0] | R[3:0] G[3:0] B[3:0] | R[3:0] G[3:0] B[3:0] | R[3:0] G[3:0] B[3:0] | |

Lower signature  0x1234

FIG. 6

METHOD OF AND APPARATUS FOR PROCESSING A FRAME

This application is the U.S. national phase of International Application No. PCT/GB2015/053077 filed 16 Oct. 2015, which designated the U.S. and claims priority to GB Patent Application No. 1418495.6 filed 17 Oct. 2014, the entire contents of each of which are hereby incorporated by reference.

BACKGROUND

The technology described herein relates to a method of, and an apparatus for, processing a frame, in particular in data processing systems that generate output frames that are composited from or otherwise formed of one or more input frames.

Methods are known which reduce the number of memory accesses in a data processing system when processing an input frame to generate an output frame, e.g. for display on a display device. The input frame may be a graphics frame generated by a GPU of the system, a video frame received and decoded by a video engine, and/or a frame containing text, audio, etc. The input frames may be processed by a composition engine to composite two or more input frames into a single output frame, by a processor to perform sharpening, smoothing, etc., and/or by the video engine to encode a video frame before transmission. It is possible, for one or more stages of the processing to be performed on an input frame, to eliminate one or more of the read or write transactions between a memory and the module performing the processing. For example, this may be achieved by comparing a region (e.g. a processing tile) of the input frame to be read from or written to the memory with a region already read from (and e.g. stored in a buffer) or written to the memory, such that when the two regions are determined to be similar, the read/write transaction to be performed may be eliminated by reusing the region that has already been read/written.

These methods are particularly useful in cases where a series of input frames are similar to each other, for example having an unchanging background, such that regions of the unchanging background from one input frame may be reused for the subsequent input frames, and/or where an input frame has an area of plural regions that are similar to each other, for example the sky, the sea or a solid-colour background, a region of the area can be reused for other regions of the area.

However, the methods described above become less effective in cases where the input frames contain noise, such that comparison between two similar regions may not result in a match, and/or where two input frames being compared have the same content but have small differences such as horizontal shifting and/or slight difference in viewing angle.

An example include images captured using a digital camera. When an image is captured using a digital camera, the data is sent from the camera to the camera image signal processor (ISP). A number of processes may be performed by the ISP on the captured image, for example de-mosaicing, lens shading, defective pixel correction, etc. The resulting image and any image statistics, which are processed to determine a white balance, are written to memory. The image may then be fetched for further processes to be performed such as automatic white balancing, de-noise or sharpening, colour conversion, format conversion (to e.g. JPEG), etc., and the final processed image is output.

The processing of a captured image to generate an output image can therefore be extensive, and the number of memory accesses can be high. It is therefore desired to reduce the number of memory accesses for noisy content.

Another example, illustrated in FIG. 1, is stereoscopic 3D technologies, in which an output image 10 as perceived by a viewer comprises a pair of left 11 and right 12 images corresponding to a scene 13 as seen respectively by the left and right eyes of the viewer. In order for the viewer to perceive the scene in three dimensions, the scene in the left image 11 is shifted horizontally with respect to the scene in the right image 12 by the interocular distance (the distance between the eyes) 14, as illustrated in FIG. 1, to imitate the difference between the images seen by each eye.

The left and right images 11, 12 may be stored (and transmitted) in a left and right (side by side) or a top and bottom (one subsequent to the other) format, as illustrated in FIG. 2. The left and right images are fetched by a display controller and may be manipulated (processed) according to the output display technology. Stereoscopic 3D displays may display (or project) the left and right images 11, 12 as alternate frames (e.g. shutter-based or polarized RealD 3D technologies), as shown in FIG. 3 or as an interleaved frame (e.g. parallax barriers) 15, as shown in FIG. 4. Due to the difference in the viewing origin separated by the interocular distance, the viewing angles (and possibly the lighting conditions) of the left image and of the right image may have some, albeit small, differences.

It is therefore desired to reduce the number of memory accesses when processing frames, e.g. for display, for cases where the content of frame regions is expected to show some similarities (but without being exactly the same), so that bandwidth and power consumption in such situations may be reduced.

BRIEF DESCRIPTION OF THE DRAWINGS

Embodiments of the technology described herein will now be described, by way of example only, with reference to the accompanying drawings, in which:

FIG. 6 shows an example of signature arrangements for a frame used in the embodiments of the technology described herein;

Like reference numerals are used for like features throughout the drawings, where appropriate.

DETAILED DESCRIPTION

Figure 1:
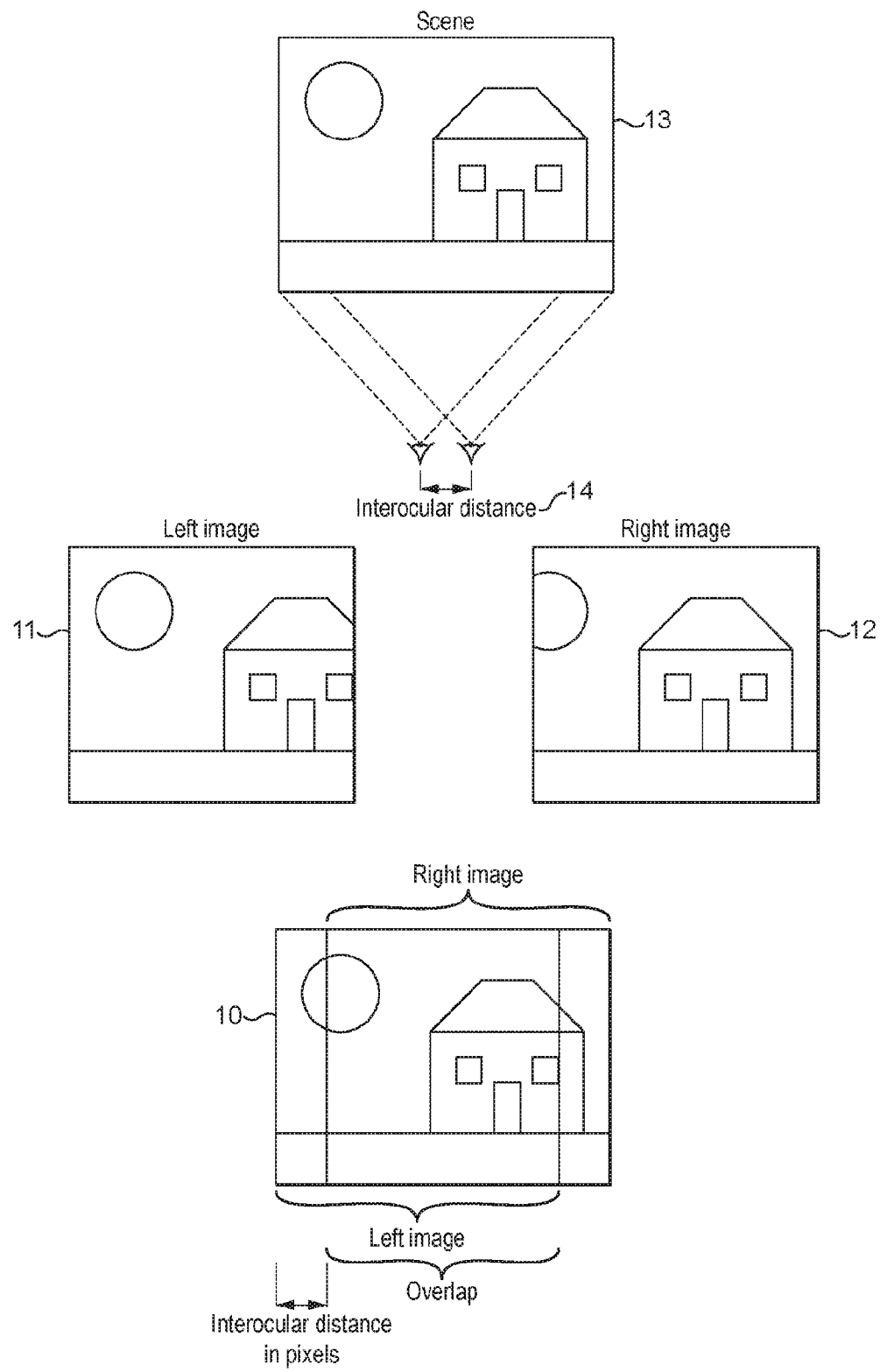
FIG. 1 illustrates an interocular distance in a stereoscopic 3D image.
Figure 2:
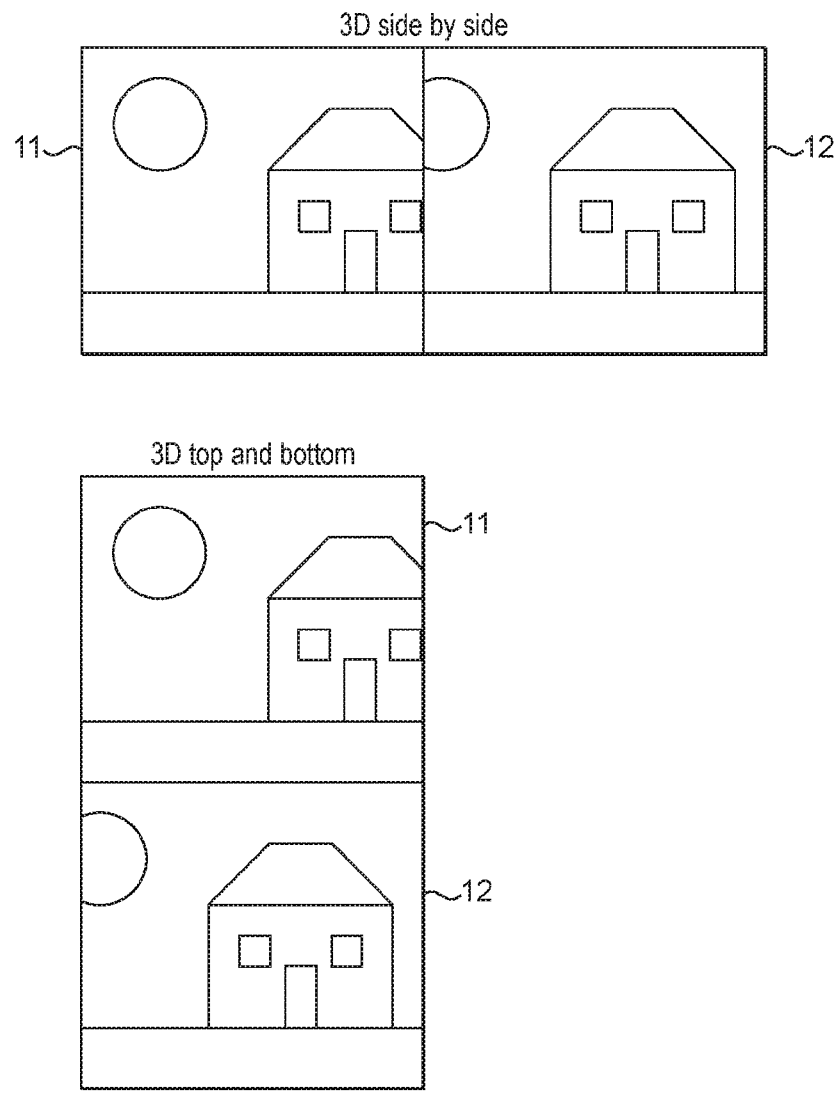
FIG. 2 illustrates different formats for storing a stereoscopic 3D image.
Figure 3:
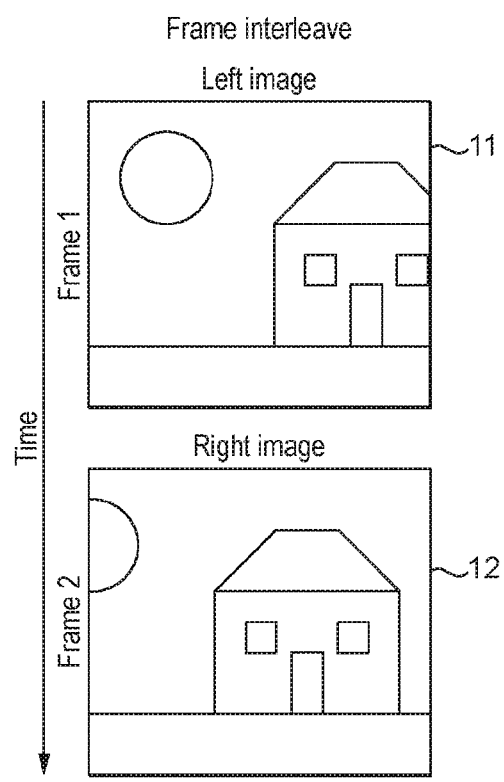
FIG. 3 illustrates frame interleaving.
Figure 4:
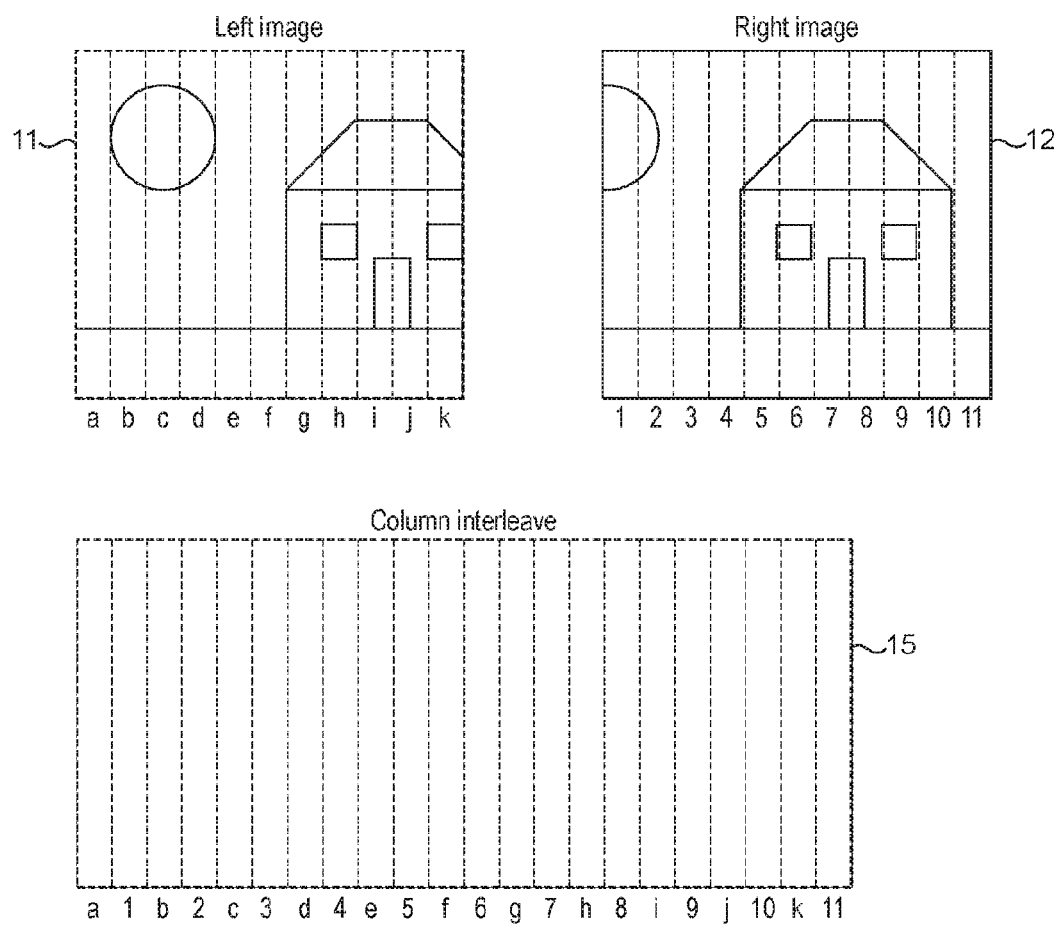
FIG. 4 illustrates column interleaving.

An embodiment of the technology described herein comprises a method of processing a frame in a data processing system. The processed frame may be used, alone or combined/composited with one or more other frames, e.g. to provide an output image. The frame comprises one or more frame regions that together form the frame. Each frame region is represented as one or more data values, with each data value being represented by a set of data.

The method comprises, for at least one region of the frame, when a memory access operation is to be performed for the region of the frame:

comparing a portion of the data representing data values for the frame region with a corresponding portion of the data representing the corresponding data values for a previous frame region, which is a frame region for which the memory access operation has been performed, to determine if the portion of the data representing the data values for the frame region is similar to the corresponding portion of the data representing the data values for the previous frame region, wherein the portion of the data representing the data values for a frame region comprises a sub-set of data from each set of data representing a data value of the data values for the frame region; and omitting the memory access operation for the portion of the data representing the data values for the frame region if it is determined to be similar to the corresponding portion of the data representing the data values for the previous frame region; or performing the memory access operation for the portion of the data representing the data values for the frame region if it is determined not to be similar to the corresponding portion of the data representing the data values for the previous frame region.

Another embodiment of the technology described herein comprises an apparatus for processing a frame in a data processing system. The frame comprises one or more frame regions that together form the frame. Each frame region is represented as one or more data values, with each data value being represented by a set of data.

The apparatus comprises control circuitry that is configured to, when a memory access operation is to be performed for a region of a frame:

compare a portion of the data representing data values for the frame region, with a corresponding portion of the data representing the corresponding data values for a previous frame region, which is a frame region for which the memory access operation has been performed, to determine if the portion of the data representing the data values for the frame region is similar to the corresponding portion of the data representing the data values for the previous frame region, wherein the portion of the data representing the data values for a frame region comprises a sub-set of data from each set of data representing a data value of the data values for the frame region; and omit the memory access operation for the portion of the data representing the data values for the frame region if it is determined to be similar to the corresponding portion of the data representing the data values for the previous frame region; or perform the memory access operation for the portion of the data representing the data values for the frame region if it is determined not to be similar to the corresponding portion of the data representing the data values for the previous frame region.

The technology described herein relates to arrangements in which, a frame, e.g. a raw image, a graphics frame, a video frame, or a composite frame, etc., to be processed is processed as one or more frame regions. It is recognised that a frame region for which a memory access operation is to be performed (to write the frame region to memory or to fetch the frame region from memory) may be the same as or very similar to a frame region for which the memory access operation has already been performed. For example, a sequence of video frames may have the same background such that the background frame regions are the same or very similar in successive frames, or a uniform background (e.g. the sky) may cover an area of the frame such that frame regions of the background are the same or very similar. In these cases, memory access operations for some frame regions may be eliminated by reusing a previous frame region that is found to be the same or similar.

However, it is also recognised that there are instances where one frame region may only differ from another in a manner that although causing the frame regions to appear to differ, would not in fact prevent at least some of one frame region from being re-useable for another. For example, for noisy content such as images captured by a digital camera, it may be problematic to identify two frame regions of an input frame that are similar, as the noise may cause small fluctuations in the image data of the two frame regions that skew the result of a comparison between the two frame regions. In another example, for stereoscopic 3D images formed of a pair of left and right images, the pair of images are similar once the interocular distance in the pixels of the two images is compensated, but there may be small differences due to differences in lighting conditions and viewing angles.

The Applicants have recognised that for frames with, e.g., noisy or slightly different contents, although the frame regions as a whole may differ (e.g. due to the noise) there may still be a subset or subsets of the data that represents the data values of the frame regions that is/are (sufficiently) similar.

It will be appreciated in this regard that a given frame being processed will normally (and does in an embodiment) comprise a plurality of sampling positions (an array of data positions) that together form the frame. For each sampling position of the frame, a data value or values (e.g. RGB values) will be stored, and each data value will be represented by, for example, a number of bits, such as an 8-bit number (where the frame is stored in RGB888 format, for example). The Applicants have recognised that while the overall data values for a frame region could be caused to be different to another frame region, e.g., due to noise, it may still be the case that a subset of the set of data that represents the data values for a frame region will be the same. For example, it may be that the most significant bits of the data values for a frame region will be the same, even if the least significant bits differ (e.g. due to "noise").

The technology described herein exploits this by comparing portions of the data representing the data values of frame regions, with each data portion being a subset (e.g. a set of the most significant bits) of the set of data that represents the data values of the frame region. In this case, even if the overall data values (e.g. colour values) for frame regions differ, similarities between subsets of the data that represents the data values can still be identified and exploited.

The comparison between a data subset (portion) of a current frame region and the corresponding data subset (portion) of a previous frame region determines whether the respective data subsets (portions) are similar to each other. If the data portion of the current frame region is determined to be similar to a corresponding data portion of a previous frame region, the corresponding data portion (subset) of the previous frame region can be reused for the current frame region, and so the memory access operation for that data portion of the current frame region can be omitted. If the data subset (portions) of the current frame region is determined not to be similar to a corresponding data subset (portion) of a previous frame region, the memory access operation is performed.

Thus, when a memory access (write or read) operation is to be performed for a current frame region, a similar data portion or portions from a previous frame region may be reused such that the memory access operation for the data portion may be omitted. Memory access operations are then only required to be performed for data portions of a current frame region determined not to be similar to corresponding data portions of a previous frame region. It is therefore possible to partially eliminate the memory access operation for a frame region even when there are some overall differences, for example due to noise and/or small differences in lighting conditions and/or viewing angles, between the frame region and a previous frame region.

The frame that is processed in the manner of the technology described herein can comprise any suitable and desired frame. It should be, and is in an embodiment, represented as an array of data (sampling) positions, with each data (sampling) position having one or more associated data values. The frame is in an embodiment a frame intended for display, but this need not be the case, and it could equally be a frame that is intended for use for other purposes, e.g. as a texture within a graphics processing system. The frame is in an embodiment an image. In one embodiment the frame is an image captured using a digital camera (and that is, in an embodiment, being processed by the image signal processor (ISP)). In another embodiment, the frame is a frame for use to generate a stereoscopic 3D image.

The regions of the frames that are considered in the technology described herein can be in any suitable or desired form. The frame regions could comprise the entire frame (i.e. such that the frame will have a single region comprising the entire frame). However, in an embodiment, each frame region is a smaller part (area) of the frame, i.e. each frame region represents some but not all of the (area of the) frame in question.

In this case, the smaller frame regions that the frame is divided into can be any desired and suitable size or shape, but are in an embodiment rectangular (including square), and in an embodiment 8×8, 16×16 or 32×32 sampling (data) positions in size. In an embodiment, each frame region corresponds to one or more "processing" tiles that the frames are divided into for processing purposes, for example to a tile (or tiles) that a graphics processor, video engine, image processor, display controller, composition engine, etc. that is generating or processing the frame in question operates on and produces as its output.

In these arrangements of the technology described herein, the tiles that the frames are divided into can be any desired and suitable size or shape, but are in an embodiment of the form discussed above (thus in an embodiment rectangular (including square), and in an embodiment 8×8, 16×16 or 32×32 sampling positions in size).

A frame region may correspond to a single processing tile, be made up of a set of plural "processing" tiles, or comprise only a sub data portion of a processing tile. For example, in video applications, where video frames are encoded in units of macroblocks, each frame region may be a video frame macroblock that comprises plural tiles that the video and/or graphics processor operates on.

In some embodiments, the plural frame regions of a frame may not all be of equal size.

Other arrangements for dividing a frame into regions are of course possible.

The portions of the data representing the data values for the frame regions that are compared can be any suitable and desired portion of the data representing the data values for the frame regions. As discussed above, each data portion will comprise a subset from each set of data representing a data value of the data values for the frame region that are being considered. In an embodiment each data portion comprises a corresponding subset (i.e. the equivalent subset) from each set of data representing a data value of the data values for the frame region that are being considered, although this is not essential (and thus different subsets from different data values could be used, if desired). Thus, for example, the data portion for a frame region may, and in an embodiment does, comprise a selected subset of the bits for each data value of the data values for the frame region that are being considered.

Thus, in an embodiment, the data portions that are being compared comprise a selected set of bits from each set of bits that represents the data values for the frame region that are being considered. Thus, for example, for RGB data values, a data portion for a frame region may comprise, e.g., R[x:y], G[x:y], B[x:y], where x and y indicate respective bit positions in the RGB values. In one embodiment, the data portions being compared comprise a selected set of the most significant bits for each data value of the data values for the frame region that are being considered.

Thus, for example, where a frame region comprises a plurality of sampling positions each represented by a plurality of bits, e.g. 1024B for a 16×16 sampling position frame region at 32bpp, the data portions that are being compared may, e.g., and in one embodiment do, comprise a (and the same) selected number of most significant bits from the data values for each sampling position.

The frame regions may be divided into as many data portions for the purposes of the technology described herein as are desired. In an embodiment each frame region is divided into at least two data portions. In one embodiment each frame region is divided into (and can be processed as) at least two data portions, a "higher order" data portion comprising a given, in an embodiment selected, number of the higher-order bits (MSBs) of the data values for the frame region in question, and a "lower-order" data portion comprising a given, in an embodiment selected, set of the lower-order bits (LSBs) of the data values for the frame region.

For example, where the data values for the frame are stored in an RGB888 format, each frame region may be divided into a higher order data portion of higher-order bits (Most Significant Bits or MSB, e.g. R[7:4], G[7:4], B[7:4]) and a lower order data portion of lower-order bits (Least Significant Bits or LSB, e.g. R[3:0], G[3:0], B[3:0]). Other arrangements of data portions are of course possible. For example, each frame region may be divided into three or more data portions, e.g. RGB[7:5], RGB[4:2] and RGB[1:0].

Thus, in an embodiment, a frame region, and in an embodiment each region of the frame, is divided into (and comprises) a plurality of data portions that combine to provide the overall data values for the frame region.

Each data portion of a frame region may be a subset of the data for the frame region containing an equal amount of data of the frame region, or each data portion may contain different amounts of the data for the frame region.

The data values for a frame region that a given data portion represents and corresponds to may be all the data values for the frame region, or, e.g. in particular where the data for the frame region has different components or channels, may be data values for only one of, or only a subset of, the data components (channels) for the frame region. For example, for an RGB frame, the data values for a frame region that a data portion represents could be the RGB values for the frame region or there could, e.g., be separate data portions for each individual (colour) channel (thus a "red" data portion, a "green" data portion, and a "blue" data portion), or, for example, data portions representative of only two but not all three of the colour channels.

Similarly, the data values for a frame region that a given data portion represents and corresponds to may be the data values for all the data positions (sampling positions) of the frame region (and in an embodiment, this is the case), or they may be the data values for only some but not all of (for a subset of) the data positions of the frame region.

A data portion for a current frame region is compared to a corresponding data portion for a previous frame region (which is a frame region for which the memory access operation has been performed). The comparison should be with the data portion of the previous frame region that comprises the corresponding (equivalent) data to the data portion for the current frame region that is being considered. Thus "corresponding" data portions of two frame regions will, and in an embodiment do, comprise the same subsets of the sets of data representing the data values for the frame regions for the respective frame regions (and, where appropriate, relate to the same "subset" of data values (e.g. data channels)).

The current frame region being considered may be compared with only a single previous frame region or with plural previous frame regions, as desired. The current frame region being considered may be compared with a previous frame region or regions from the same frame, or with a previous frame region or regions from one or more previous frames, or with both a previous frame region or regions from the same frame, and with a previous frame region or regions from one or more previous frames.

Thus the current frame region and the previous frame region may belong to the same frame that is a current frame being written or read (e.g. a captured image being processed by a camera ISP), or the current frame region may belong to the frame currently being processed while the previous frame region belongs to a previous frame that has already been processed (written or read) (e.g. the left and right images or the current and previous left (or right) images of a stereoscopic 3D image). Where the previous frame region belongs to a previous frame, the previous frame may be a frame that is processed immediately before the current frame or a frame separated (in time) from the current frame by more than one other processed frame.

It will be appreciated in this regard that where the current frame region being processed is compared with a frame region from the same frame, then it will be compared with a frame region having a different position within the frame. Where the comparison is with a previous frame region from one or more previous frames (i.e. from a different, preceding frame), then the comparison may be with a frame region from that previous frame that is in the same position in the frame as the current frame region or that is in a different position within the frame to the current frame region (or both, where comparisons with plural previous frame regions are permitted and being performed).

Where there is a comparison with a previous frame region from a previous frame, then in an embodiment the comparison is at least with respect to the frame region in the previous frame that has the corresponding position in the previous frame to the current frame region that is being processed in the current frame.

Where the frame regions being compared are from respective left and right frames of a stereoscope 3D image, then in an embodiment the frame regions from the respective left and right frames that are being compared are relatively displaced in the horizontal direction by the interocular distance (in an embodiment as measured in terms of data (sampling) positions) that was used to generate the left and right frames. This will then offset the effect of the relative horizontal shifting by the interocular distance of the respective pairs of left and right images when forming stereoscopic 3D images, such that the frame regions being compared will accordingly represent the same part of the image.

Thus, in an embodiment, when performing a comparison between corresponding data portions of a current frame region of a current frame and a previous frame region of a previous frame, the previous frame region is in an embodiment selected to be a frame region at a position in the previous frame that is shifted, in an embodiment, horizontally, in an embodiment by the interocular distance, with respect to the position of the current frame region in the current frame.

Where it is not already available to the system from other sources (e.g. because it has already been provided to the data processing system), the interocular distance that has been used for the frames can be calculated for this purpose in any desired and suitable manner.

If necessary, and where required, metadata indicating which frame region of a frame a given frame region being processed has been compared with (and thus should be replaced by, where appropriate) can be determined and stored for use by the system.

The comparison between corresponding data portions of two frame regions to determine if the data portions are similar may be done in any suitable and desired manner. For example, some or all of the content of the data portions may be compared.

A determination of whether a data portion of a current frame region is similar to a corresponding data portion of a previous frame region may require an exact match between the data portions. In some embodiments, small differences between the data portions may be tolerated, if desired. For example, the similarity determination may be such that the corresponding data portions of the current and previous frame regions are determined to be similar even if they do not match exactly, e.g. if the difference is less than or equal to a given, in an embodiment selected, similarity threshold. In an embodiment, small differences that are deemed insignificant are ignored for the similarity determination, thereby increasing the likelihood of a data portion of a current frame region satisfying the condition of being sufficiently similar to corresponding data portion of a previous frame region.

In embodiments, the data portion comparison is performed by comparing information representative of and/or characteristic of the content of the data portions of the frame regions, to assess the similarity or otherwise between the respective data portions of the frames regions.

The information representative of the content of a data portion of a frame region may take any suitable form, but is in an embodiment based on or derived from the content of the respective data portion. In embodiments, it is in the form of a signature (or multiple signatures) for the data portion which is generated from or based on the content of the data portion of the frame region in question. Such a content "signature" may comprise, for example, any suitable set of derived information that can be considered to be representative of the content of the data portion, such as a checksum, a CRC, or a hash value, etc., derived from (generated for) the data for the potion in question. Suitable signatures would include standard CRCs, such as CRC64, CRC32, or other forms of signature such as MD5, SHA 1, etc.

Thus, in embodiments, a signature (or signatures) indicative or representative of, and/or derived from, the content of the data portions of the frame region is generated for the data portions that are to be checked, and the comparing process comprises comparing a signature for a data portion of a frame region (e.g. the current frame region) with a signature for a corresponding data portion of another frame region (e.g. the previous frame region). The comparison in an embodiment determines whether the signatures representing the respective data portions are the same or sufficiently similar.

Thus, in an embodiment where the data for the frame regions is, e.g., divided into a low-order data portion comprising the LSBs of the data values for the frame region and a high-order data portion comprising the MSBs of the data values of the frame region, respective low-order (LSB) content-indicating signatures based on only selected, least significant bits (LSB) of the data in each frame region, and/or respective high-order (MSB) content-indicating signatures based on only selected, most significant bits (MSB) of the data in each frame region are generated and compared.

In this case, the signatures that are compared when comparing the data portions of the frame regions will be generated using only selected bits, e.g. a selected set of the MSB (or LSB) of the data values for the frame regions (e.g. R[7:4], G[7:4] and B[7:4] where the surface data is in the form RGB888). Thus, in an embodiment, the signatures that are compared are based on a selected set of the bits of the data for the frame regions.

In this case, a separate data portion signature may be generated for each different data portion to be considered.

Alternatively or in addition, in a system where "full" signatures (e.g. CRC values) using all the data for a frame region are required (e.g. for other purposes), then in an embodiment both a single full signature and one or more separate smaller signatures (each in an embodiment representative of particular sets of bits from the frame region data) are in an embodiment provided for each frame region.

For example, in the case of RGB 888 colours, as well as a "full" R[7:0], G[7:0], B[7:0] signature, one or more "smaller" separate signatures could also be provided (e.g. a first "MSB colour" signature based on the MSB colour data (e.g. R[7:4], G[7:4], B[7:4]), a second "mid-colour" signature (R[3:2], G[3:2], B[3:2]), and a third "LSB colour" signature (R[2:0], G[2:0], B[2:0]).

In this case, the separate MSB colour, mid-colour, and LSB colour signatures could be generated and then concatenated to form the "full signature" when that is required, or, if the signature generation process permits this, a single "full" colour signature could be generated which is then divided into respective, e.g., MSB colour, mid-colour and LSB colour signatures.

In this case, the MSB and mid-colour colour signatures, for example, could be used for the operation of the technology described herein, but the "full" colour signature could be used for other purposes.

Signatures for respective data portions of frame regions may be generated and/or fetched in any suitable or desired manner. In some embodiments, a signature for a data portion of a frame region may be generated at the same time as the frame region is being generated. The data portions of the frame region and the corresponding signatures are written together, and, when required, the signature is fetched together with each respective data portion of the frame region. For example, in applications involving an image processor and/or display controller that performs processing on an input frame to be displayed, a signature is stored with the corresponding data portion of a frame region and can be fetched with the data portion when the frame region is fetched for processing.

In other embodiments, signatures for corresponding data portions of a frame region are only generated after a processing engine has received the frame region for processing. For example, in applications involving a camera ISP (image signal processor) that processes images captured by a digital camera or a video engine that processes video frames, signatures may be generated only when the frame region is processed by the processor. In this case, once the signature of each data portion of the frame region have been generated, they may be written to memory together with the processed frame region and stored for later use. When a new frame region is being processed, the stored signature(s) of the current frame region may be fetched and compared with signature(s) generated for the new frame region.

Thus, in embodiments, when a data portion of a current frame region, e.g. one or more sets of bits of the data values for a region of a current frame, is to be compared with a corresponding data portion of a previous frame region, e.g. one or more set of bits of the data values for another region of the current frame or for a region of a previous frame that has been written or read, signatures for the respective data portions are fetched from memory. If no signature is found for the data portion of the current frame region, a signature for the data portion of the current frame region may be generated based on the content of the data portion of the current frame region.

As discussed above, a frame region considered in the manner of the technology described herein may be made up of a single "processing" tile, a set of plural processing tiles, or comprise only a sub-region of a processing tile. In the latter case, the signatures for the tile may still be used, e.g., for the purposes of comparing data portions of the frame region that the tile encompasses. Equally, it may not be necessary for there to be an exact correspondence between the tiles that the signatures are generated for and the frame regions that are to be compared. In the case that there is not an exact correspondence, then in an embodiment signatures for all the tiles that the frame region at least in part covers are compared to determine if data portions of the frame region can reuse data portions of another frame region or not.

The signature generation, where used, may be implemented as desired. For example, a signature generator may be implemented in an integral part of the GPU, video engine (e.g. encoder/decoder), image processor, display controller and/or the composition engine of an image/video processing system, or there may for example be a separate "hardware element" dedicated for this function, e.g. in a host device or in a display device. A signature generator may be provided for one or more or each hardware block, or a single signature generator may be shared amongst plural hardware blocks.

The signatures for the data portions of the frame regions are in an embodiment appropriately stored and associated with the frame regions or the data portions of the respective frame regions to which they relate. In some embodiments, they may be stored with the frames in the appropriate buffers, for example the frame buffer. Then, when the signatures are to be compared, the stored signatures for a frame region may be retrieved appropriately. However, in some embodiments, the signatures may be generated for the frame regions only when the frame regions are being compared.

When a frame is being processed on a region by region basis, the processing may include any one or more processing stages that result in a final output image. The output image may be generated from a single frame or more than one frame (e.g. a stereoscopic 3D image generated from a pair of left and right images). When memory access operation is being performed for a current frame region, the comparison of the data portions of the current frame region may be performed with the corresponding data portions of any other frame regions for which the memory access operation has been performed. Thus, the other frame region may be a frame region that belongs to the same frame as the current frame region or it may be a frame region that belongs to a different frame.

The memory access operation that is being performed may be a write operation (to write the frame region to memory) or a read operation (to read the frame region from memory).

In one embodiment it is a write operation. In such an embodiment, a (or plural) data portion of a frame region to be written to memory may be compared with a corresponding data portion of a frame region already written to memory, and if the data portion of the frame region to be written to memory is determined to be similar to a corresponding data portion of a frame region already written to memory, the writing (write transactions) of the data portion may be eliminated. For example, when a corresponding pair of left and right images of a stereoscopic 3D image is being generated by a GPU, after the left image has been generated and written to memory, data portions of frame regions of the left image may be compared with corresponding data portions of frame regions of the right image after it has been generated so as to try to eliminate the writing of data portions of the right frame regions to memory.

In another embodiment, the memory access operation is a read operation. In this case, a data portion of a frame region to be read (fetched) from memory may be compared with a corresponding data portion of a frame region already read (and that is, e.g. now stored elsewhere, such as in a buffer), and if the data portion of the frame region to be read is determined to be similar to a corresponding data portion of a frame region already read (fetched), the reading (fetching) (read transaction) of the data portion may be eliminated. For example, when a corresponding pair of left and right images of a stereoscopic 3D image is being output to a display device, e.g. using a column interleaving technique, after a column of e.g. the left image has been read from memory and stored in a buffer, data portions of frame regions of the left image column in the buffer may be compared with corresponding data portions of frame regions of a right image column to be fetched, so as to try to eliminate the reading of data portions of the right image column from memory.

In an embodiment, the technology described herein is applied to both read and write operations for the frame region or regions.

If a data portion of a previous frame region is determined to be similar to the corresponding data portion of the current frame region, the memory access operation is omitted for the data portion of the current frame region (and, in an embodiment, the corresponding data portion of the previous frame region is (re-)used for the data portion of the current frame region). On the other hand, if the data portion of the current frame region is determined not to be similar to a corresponding data portion of a previous frame region, the memory access operation is performed as normal for the data portion of the current frame region (thus the data portion for the current frame region will be written to, or read from, memory in the normal way for the process in question).

Then, when the current frame region is needed for use, it should be, and is in an embodiment, formed by combining the one or more data portions of the current frame region for which the memory access operation has been performed with any data portion or portions of the previous frame region determined to be similar.

Thus, in an embodiment, the memory access operation will be performed for only some but not all of the data portions for a frame region (e.g. will be performed for a low-order data portion of a frame region, but not for a high-order data portion of a frame region), and the frame region will be formed by combining a data portion or portions of the frame region for which the memory access operation has been performed, with a data portion or portions of one or more previous frame regions. Thus, for example, in the case of a write operation, only the non-matching data portion(s) needs to be written to memory, with any matching data portion of a previous frame region that is already present in the memory being used instead of the "matched" data portion of the current frame region.

In an embodiment, particularly where the memory access operation is (and can be) performed for only some but not all of the data portions for a frame region, metadata indicating for which data portions the memory access operation has been omitted (and which respective previous frame region's corresponding data portion should be used instead (if required)) is stored in association with the data for the frame region.

Thus, in an embodiment, a frame is stored such that each frame region of the frame is stored as two (or more) separate data portions, e.g. a data portion comprising the MSB of the frame region and a data portion comprising the LSB of the frame region. For example, the low-order data portion of the sampling positions of a frame region, e.g. ARGB[3:0] of the 256 positions in a frame region (16×16 frame region), may be stored separately from the high-order data portion of the sampling positions of the frame region, e.g. ARGB[7:4] of the 256 positions in the frame region.

The frames may be stored in memory in any suitable or desirable manner. In an embodiment, the data portions for a (and in an embodiment for each) frame region are stored separately, i.e. such that they can be read or written separately to each other. This will then allow the data portions of the frame regions to be written or read separately in an efficient manner and facilitates the comparison and reusing of data portions of the frame region.

In an embodiment all the corresponding data portions for a frame (thus, e.g., the respective higher-order data portions for all the frame regions that the frame has been divided into) are stored together, such that they can then be identified and accessed separately to other data portions (e.g. low-order data portions) of the regions of the frame. In an embodiment each frame is stored following the same format, e.g. by storing the same set of data portions (e.g. the low order data portions) for the frame region first, followed by the other (or another) data portion (e.g. the high order data portions) for the frame regions (and so on, if required).

Where compression is to be performed on a frame, and each frame region is being treated as (and stored as) a plurality of data portions, the plurality of data portions (e.g. a low-order data portion and a high-order data portion) for each frame region may be, and are in an embodiment, compressed separately (in similar manner to the partial reading and writing of frame regions described above).

Alternatively or additionally, if the frame has been compressed using a compression scheme that allows compression and decompression of separate data portions for a frame region (e.g. using the data compression scheme described in the Applicant's U.S. Pat. No. 8,542,939), such that compression or decompression of the frame region may be performed respectively to compress or to extract a data portion for the frame region (but not all of the frame region) then, when it is determined that one or more data portions for a current frame region (e.g. the high-order data portion) is/are similar to corresponding one or more data portions of a previous frame region, the memory access operation only needs to be performed to write or read the compressed data portion or portions of the current frame region that correspond(s) to the data portion or portions determined not to be similar to a corresponding data portion or portions of the previous frame region (e.g. the low-order data portion).

In this example, the, e.g. low-order, data portion of the current frame region on which the partial memory access operation is performed is in an embodiment written to memory together with metadata indicating that any other data portion (e.g. the high-order data portion) for the frame region that the memory access operation has not been performed for corresponds to the respective (e.g. high-order) data portion of a previous frame region. Thus, when required, the complete current frame region may be formed by decompressing the previous frame region and using the, e.g. high-order, data portion thereof and combining it with the decompressed low-order, e.g. data portion of the current frame region.

Although in these arrangements decompression of frame regions may be performed in any suitable and desirable order, in embodiments, it is performed in the same order as that of compression, such that the needed decompressed previous frame region data portion, e.g. the high-order data portion, would be available when the current frame region is being decompressed. The amount of processing, and thus bandwidth and power consumption, can thus be reduced.

As discussed above, the previous frame region being compared to the current frame region may belong to the same frame that is being written or read, or the previous frame region may belong to a previous frame that has already been written or read, as appropriate and desired.

In some embodiments, an output image is generated from multiple frames, where the multiple input frames may be very similar though not the same. For example, the output image may be a stereoscopic 3D image that comprises a pair of left and right images (frames), where the left and right images have similar content with small differences. In this case, data portions of a frame region from one image of the pair that has been written or read may be and are in an embodiment compared with corresponding data portions of a frame region from the other image of the pair that is being written or read to determine if any one or more of the data portions is/are similar and therefore can be reused. This may be instead of or in addition to (and in an embodiment is in addition to) also comparing data portions of the frame region from one image of the pair with corresponding data portions of respective frame regions of a previous version of that image of the pair (thus, for example, a new left image for a stereoscopic pair may be compared both with its corresponding "paired" right image, and/or with one or more previous left (and/or right) images, and vice-versa).

Although the technology described herein has been described above with particular reference to the comparison of a given data portion of a given frame region, as will be appreciated by those skilled in the art, the process can be, and in an embodiment is, applied to plural (e.g. selected) data portions for the frame region in question. Thus, for example, where a frame region is divided into, e.g., three data portions (e.g. a low-order, a mid-order and a high-order data portion), then two or more of (e.g. the high-order and mid-order data portions), or each of, the data portions may be compared with corresponding data portions of previous frame regions in the manner described.

In an embodiment, the comparison of the data portion for a frame region with the corresponding data portion of the previous frame region is performed for at least the highest order (e.g. the MSB) data portion that the frame region has been divided into (as this is mostly likely to match a previous frame region's corresponding data portion).

Where each frame region is or can be divided into plural data portions (as discussed above), and the data portion comparison process can be (and is to be) performed for plural (e.g. all) of the data portions that the frame region has been divided into, then it would be possible simply to always test all the plural data portions of the frame region that are to be tested (and in one embodiment this is what is done).

However, in an embodiment, one data portion of the frame region is tested first, and then any other data portions for the frame region are only tested if the first data portion that is tested is found to be similar to a corresponding data portion of a previous frame region (and so on, if desired, where the frame regions are divided into or can be considered as more than two data portions). This will then allow the data portion comparison process to take account of, for example, the fact that noise and other small differences will manifest in the low-order bits and so the low-order data portions are less likely to be similar to each other as compared to the high-order data portions (such that if the high order data portion doesn't match the low order data portion is very unlikely to match either and so need not be tested).

Thus, in an embodiment, a comparison is only performed for a lower order data portion of a frame region if the high-order data portion of the frame region has been found to be similar to the high-order data portion of another frame region.

In another embodiment, a comparison is only performed for a higher order data portion of a frame region if the low-order data portion of the frame region has been found to be similar to the low-order data portion of another frame region.

Correspondingly, the subsequent data portion comparisons are in an embodiment only performed with frame regions which the first data portion being compared has been found to be (sufficiently) similar to (and so on, if desired).

In an embodiment, as well as comparing respective data portions of frame regions, it is also possible to (and this is also done) compare all the data for a frame region (for the respective set of data values for the frame region) with all the corresponding data for a previous frame region. This would then determine whether, e.g., the frame region as a whole is similar to a previous frame region, such that the previous frame region can then simply be reused as a whole for the current frame region (rather than only respective data portions of the previous frame region being able to be reused).

In this case, either some or all of a previous frame region will potentially be reused for a current frame region. In an embodiment metadata is used to indicate whether the frame region as a whole, or only a data portion for a frame region, is to be reused for a given frame region.

In one embodiment all the data for the frame region is tested first, and only if that data when tested is found not to be similar to the data for a previous frame region, is a respective data portion or portions of the frame region then compared to a corresponding data portion or portions of a previous frame region or regions. Other arrangements would, of course, be possible.

The comparison of all of the data for the frame regions is in an embodiment performed in a similar manner, e.g., and in an embodiment, by comparing respective signatures representative of all the data (all the data values) of the frame regions in question.

In this case, as discussed above, both "partial" and "full" content indicating signatures could be used for the comparisons, or, for example, if all the "partial" signatures are found to be sufficiently similar, then the entire previous frame region could be reused (without also performing a "full" signature comparison).

The operation of the technology described herein is correspondingly in an embodiment performed for plural regions of a given frame being processed, and in an embodiment for each region (e.g. processing tile and/or video macroblock) that the frame being processed is divided into (although it may be used for selected frame regions only, if desired).

Similarly, the technology described herein is in an embodiment repeated for plural frames in a sequence of frames, and in an embodiment for each frame in a sequence of frames (although again it may be used for only selected frames in a sequence of frames, if desired). This will be particularly applicable where, for example, the technology described herein is being applied to a system that is providing stereoscopic 3D video images for display, as in that case there will be a sequence of frames to be displayed, and the technology described herein can be applied to each frame in that sequence to reduce the number of memory access operations that are required.

The technology described herein may be implemented in any desired and suitable data processing system, such as a media processing system.

The data processing system that the technology described herein is implemented in may contain any desired, appropriate and suitable elements and components. Thus it may, and in an embodiment does, contain one or more or all of: a CPU, a GPU, a video processor (video engine/encoder-decoder), an image processor, a display controller, a display, a camera ISP, and appropriate memory for storing the various frames and other data that is required.

The comparison between a current frame region of a current input frame with a previous frame region of a previous or the same input frame may be performed by any suitable and desired component of the overall data processing system. For example, this could be performed by a CPU, GPU or separate processor (e.g. ASIC) provided in the system (in the system on-chip) or by the display controller for the display in question. The same element could perform all the processes, or the processes could be distributed across different elements of the system, as desired.

The current input frame, previous input frame, output frame, output image, any other graphics frame, video frame, composited frame, and input or output frames, etc. may be stored in any suitable and desired manner in memory, in an embodiment in appropriate buffers. For example, the frame being output is in an embodiment stored in an output frame buffer. The output frame buffer may be an on chip buffer or it may be an external buffer. Similarly, the output frame buffer may be dedicated memory for this purpose or it may be part of a memory that is used for other data as well.

Similarly, the buffers that any (e.g. input) frames are first written to when they are generated (rendered) may comprise any suitable such buffers and may be configured in any suitable and desired manner in memory. For example, they may be an on chip buffer or buffers, or may be an external buffer or buffers. Similarly, they may be dedicated memory for this purpose or may be part of a memory that is used for other data as well. The frame buffers may, for example, be in any format that an application requires, and may, for example, be stored in system memory (e.g. in a unified memory architecture), or in graphics memory (e.g. in a non-unified memory architecture).

Correspondingly, the data processing system and/or the apparatus for processing a frame may, and in an embodiment does, also comprise, and/or is in communication with, one or more memories and/or memory devices that store the data described herein, and/or that store software for performing the processes described herein. The data processing system and/or apparatus may be in communication with a host microprocessor, and/or with the display for displaying images based on the data generated.

As will be appreciated by those skilled in the art, the embodiments of the technology described herein can and in an embodiment do include any one or more or all of the features of the technology described herein described herein, as appropriate.

The technology described herein may be implemented in any suitable system, such as a suitably configured microprocessor based system. In some embodiments, the technology described herein is implemented in a computer and/or micro-processor based system.

The various functions of the technology described herein may be carried out in any desired and suitable manner. For example, the functions of the technology described herein may be implemented in hardware or software, as desired. Thus, for example, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

The technology described herein is applicable to any suitable form or configuration of, e.g., graphics/video, processor, such as processors having a "pipelined" arrangement. It is particularly applicable to tile-based graphics processors, graphics processing systems, video processors, video processing systems, composition engines and compositing display controllers.

It will also be appreciated by those skilled in the art that all of the described embodiments of the technology described herein may include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code data portions for performing the methods herein described when the program element is run on a data processor, and a computer program comprising software code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a data processing system, comprising a data processor causes in conjunction with said data processor said system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

Figure 5:
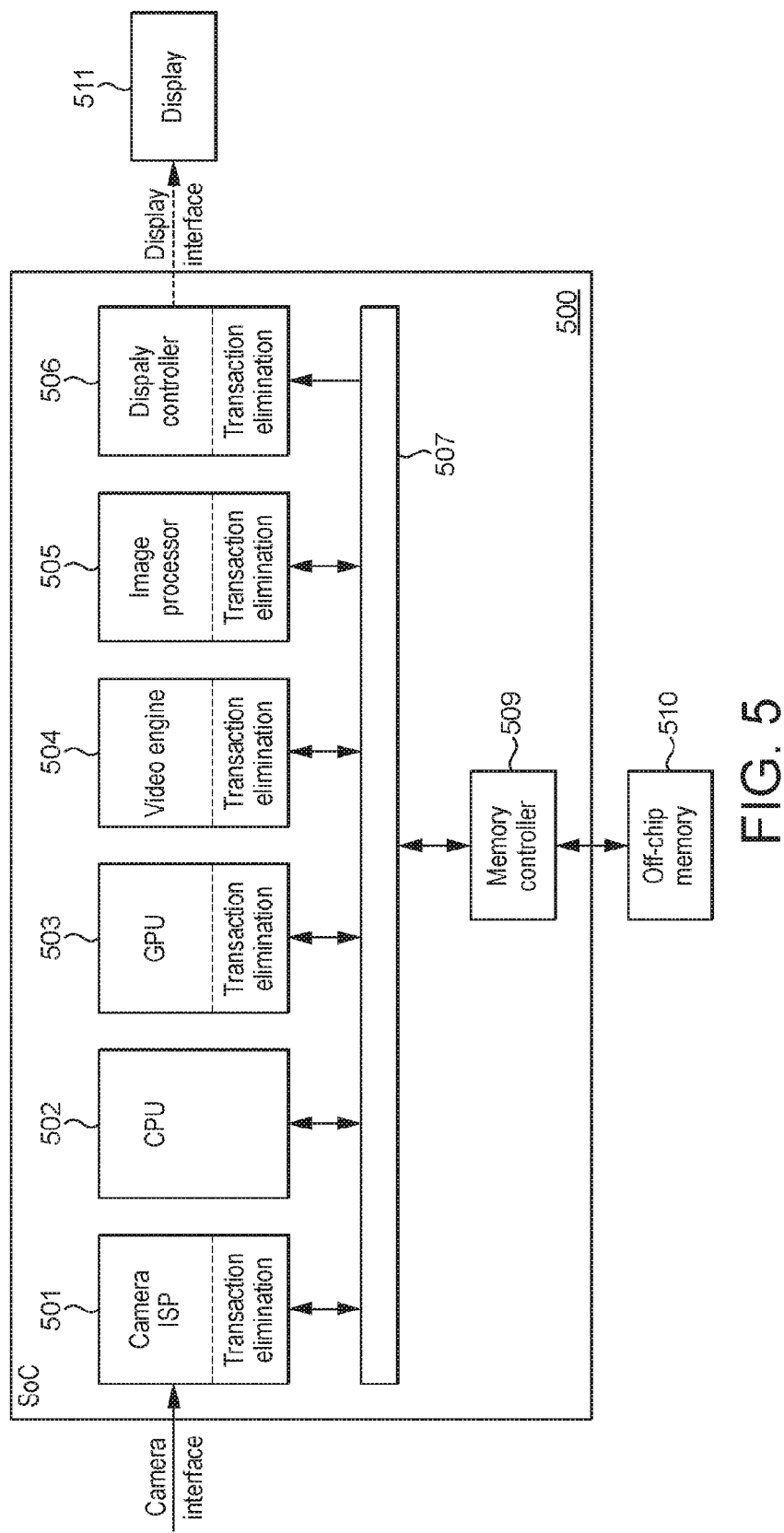
FIG. 5 is a schematic diagram showing a data processing system according to an embodiment of the technology described herein.

A first exemplary data processing system 500 is shown in FIG. 5, which is configured to implement a method of processing input frames according to a first embodiment of the technology described herein.

The data processing system 500 comprises a camera ISP 501, a CPU 502, a GPU 503, a video engine 504, an image processor 505, a display controller 506 and a memory controller 509, all communicating via an interconnect 507. The memory controller communicates to an off-chip memory 510 which is not part of the data processing system 500. Each of the camera ISP 501, GPU 503, video engine 504, image processor 505 and display controller 506 is provided with memory access operation transaction elimination control circuitry integrated into each respective module.

In the present example, the data processing system 500 may receive an input frame, e.g. a captured image by the camera ISP 501, to be processed and output for display. The input frame may undergo one or more processing operations by one or more of the modules, e.g. the camera ISP 501, the GPU 503, the video engine 504, the image processor 505 and/or the display controller 506, of the data processing system before an output image is output to a display device 511 for display. At each processing stage, there may be a memory access operation to fetch data of the input frame from memory and/or to store processed data of the input frame to memory, at which point the respective memory access operation transaction elimination control circuitry is configured to perform transaction elimination as explained below.

In the present embodiment, input frames are processed on a region by region basis. A region may, for example, be a processing tile, multiple processing tiles, a sub-tile, a macroblock, etc.

In addition, each frame region comprises (is divided into) a plurality of data portions. Each data portion corresponds to a number of bits from (a subset of the bits for) the data values for the frame region. For example, as shown in FIG. 6, a frame region 640 comprises plural sampling positions (e.g. pixels) 650 (16 in the present example for illustration purpose, but in practice a frame region may comprise fewer or more sampling positions (pixels)). For each sampling position, a set of data values is stored in an RGB format with each colour channel having a dynamic range of 12 bits.

As shown in the example of FIG. 6, the frame region is divided into plural data portions—three in this example (two data portions or more than three data portions are of course also possible)—with each data portion corresponding to (and comprising) a respective subset of the set of data representing the data values for each sampling position in the frame region (in this case respective subsets of the bits of the data values for the sampling positions within the frame region). Thus, there is an "upper" data portion 610 comprising RGB[11:8], a "middle" data portion 620 comprising RGB[7:4] and a "lower" data portion 630 comprising RGB[3:0].

Although in the arrangement shown in FIG. 6, each respective data portion for the frame region comprises the relevant set of bits for all of the colour channels (RGB), it would, if desired, be possible to also treat each colour channel (each data component) separately, or to have data portions that comprise respective subsets of the data channels. Thus there could, for example, be a "red" upper data portion, a "green" upper data portion and a "blue" upper data portion, and so on, if desired.

In the present embodiment, when a memory access operation is to be performed for a current frame region, each data portion of the current frame region is compared with a corresponding data portion of a previous frame region, which is a frame region for which the memory access operation has already been performed. The previous frame region may be a frame region that has been processed and then written to memory when the memory access operation is a write operation, or it may be a frame region that has been fetched from memory (and, e.g. stored in a buffer) when the memory access operation is a read operation. In embodiments, each frame region is divided into data portions in the same way, and thus the corresponding data portions comprise the same bits for the sampling positions of each frame region, e.g. RGB[11:8] of each frame region. The comparison is performed so as to determine if the data portion of the current frame region is similar to the corresponding data portion of the previous frame region.

For the data portion or portions of the current frame region that is/are determined to be similar to a corresponding data portion or portions of the previous frame region, the data portion or portions of the previous frame region is/are reused, and the memory access operation for the data portion and portions of the current frame region is omitted.

For the data portion or portions of the current frame region that is/are determined not to be similar to a corresponding data portion or portions of the previous frame region, the memory access operation is performed.

In this way, the memory access operation is only performed for the data portion or portions of the current frame region that is/are determined not to be similar to the corresponding data portion or portions of the previous frame region, while the corresponding data portion or portions of the previous frame region that is/are determined to be similar to the data portion or portions of the current frame region is/are reused. It is therefore possible to partially eliminate memory access operations even in a case when not all elements of a frame region are similar to another frame region.

For example, when a write operation is to be performed for a current frame region to write the current frame region to memory, each data portion of the current frame region is compared with a corresponding data portion of a previous frame region that is a frame region already written to memory. In this example, the current frame region and the previous frame region may each comprise an upper (MSB) data portion and a lower (LSB) data portion. The comparison may determine that the upper data portion of the current frame region is similar to the upper data portion of the previous frame region, but the lower data portion of the current frame region is not similar to the lower data portion of the previous frame region. In this case, the write operation of the upper data portion of the current frame region is omitted, while the lower data portion of the current frame region is written to memory.

In another example, when a read operation is to be performed for a current frame region to fetch the current frame region from memory, each data portion of the current frame region is compared with a corresponding data portion of a previous frame region that is a frame region already fetched from memory (and, e.g., stored in a buffer). In this example, the current frame region and the previous frame region may again each comprise an upper (MSB) data portion and a lower (LSB) data portion. The comparison may determine that the upper data portion of the current frame region is similar to the upper data portion of the previous frame region, but the lower data portion of the current frame region is not similar to the lower data portion of the previous frame region. In this case, the read operation of the upper data portion of the current frame region is omitted, while the lower data portion of the current frame region is fetched from memory (and e.g. stored in the buffer).

The current frame region and the previous frame region may belong to the same frame (thus the previous frame region is another region of the frame currently being processed) (e.g. a captured image being processed by the camera ISP 501), or the current frame region may belong to the frame currently being processed while the previous frame region belongs to a previous frame that has already been processed (e.g. the current left and right images of a stereoscopic 3D image, or the current and previous left/right images).

The comparison of the frame region data portions may be performed in any suitable and desirable manner. In embodiments, the comparison is performed by comparing information representative of and/or characteristic of the content of the data portions of frame regions to assess the similarity or otherwise between the respective data portions of the frame regions.

In embodiments, the information representative of the content of a data portion of a frame region is in an embodiment based on or derived from the content of the respective data portion. For example, the information may be in the form of a signature (or multiple signatures) for the data portion which is generated from or based on the content of the data portion of the frame region in question. Such a content "signature" may comprise, for example, any suitable set of derived information that can be considered to be representative of the content of the data portion, such as a checksum, a CRC, or a hash value, etc., derived from (generated for) the data for the potion in question. Suitable signatures would include standard CRCs, such as CRC64, CRC32, or other forms of signature such as MD5, SHA 1, etc.

Thus, in embodiments, a signature (or signatures) indicative or representative of, and/or derived from, the content of each data portion of a frame region is generated for each data portion of a frame region that is to be checked, and the comparing process comprises comparing the signature for the data portion to be checked with a signature for a corresponding data portion of another frame region for which the memory access operation has been performed. The comparison in an embodiment determines whether the signatures representing the respective data portions are the same or sufficiently similar.

In the example shown in FIG. 6, a single signature is generated for each of the three data portions 610, 620 and 630 of the frame region. However, if suitable or desirable, multiple signatures may be generated for one or more data portions. The signatures shown in the example here are in hexadecimal, and the signatures of the upper and middle data portions 610 and 620 are 32-bit while the signature of the lower data portion is 16-bit. It should be noted that the signature for each data portion of a frame region may be of any suitable and desirable length, and as illustrated in the present example, the signatures for the different data portions of a frame region need not have the same length (number of bits), although in some cases all signatures may be of the same length.

Figure 7:
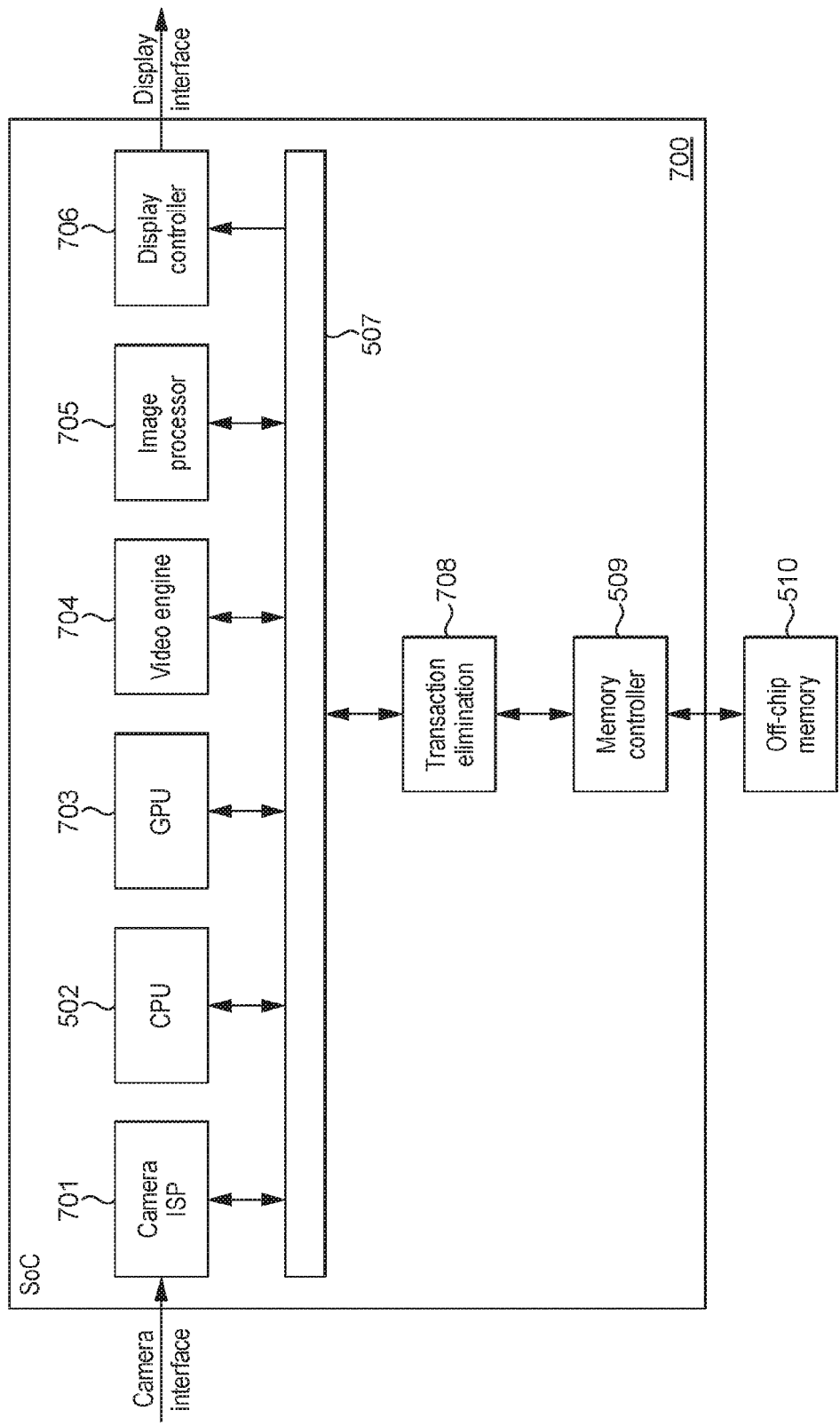
FIG. 7 is a schematic diagram showing a data processing system according to another embodiment of the technology described herein.

FIG. 7 shows another example of a data processing system 700 according to a second embodiment of the technology described herein.

The data processing system 700 comprises a camera ISP 701, a CPU 502, a GPU 703, a video engine 704, an image processor 705, a display controller 706 and a memory controller 509, that communicate via an interconnect 507. The memory controller communicates to an off-chip memory 510 which is not part of the data processing system 700.

The second embodiment differs from the first embodiment in that the data processing system 700 is provided with an additional centralised memory access operation transaction elimination control module 708 instead of each of the camera ISP 501, GPU 503, video engine 504, image processor 505 and display controller 506 being provided with an integrated transaction elimination control circuitry.

Figure 8:
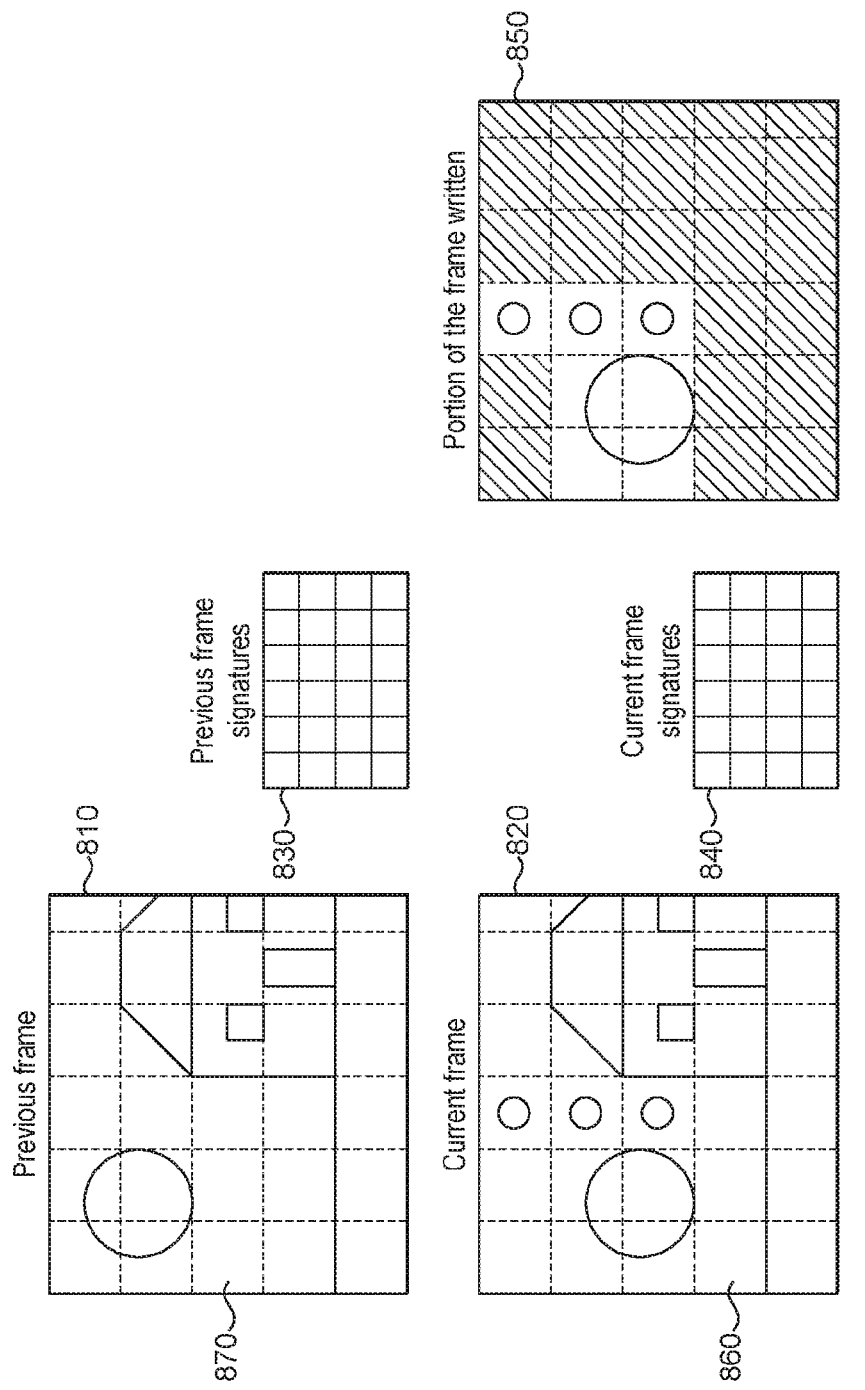
FIG. 8 shows an example of write transaction elimination.

The principle of write elimination is illustrated in FIG. 8, in which a series of frames are being written to memory, for example after being processed by one or more of the camera ISP 501 or 701, GPU 503 or 703, video engine 504 or 704, image processor 505 or 705 and display controller 506 or 706. In the example, previous frame 810 has been written to memory, and current frame 820 is being written to memory.

As can be seen in the example of FIG. 8, there may be occasions when regions 860 of a current frame being written are similar to regions 870 of a previous frame already written. In the present example, the writing of one or more regions of the frame 820 can be eliminated if the one or more regions are determined to be similar to regions of frame 810 which have already been written.

Thus in the example, a current frame region of frame 820 to be written is compared with one or more frame regions of frame 810 to determine if the frame regions are similar. The current frame region of frame 820 is compared with a corresponding frame region of frame 810, which is a frame region that is at the same position in frame 810 as the frame region of frame 820. To increase the chance of finding a similar region in frame 810, the current frame region of frame 820 may additionally be compared with other regions of frame 810. If it is determined that the current frame region of 820 is similar to a frame region of frame 810, the writing of the frame region of 820 is omitted.

The comparison between the frame 820 and the frame 810 is in an embodiment performed on a region by region basis. The frame regions may be divided in any suitable way as desired, such that a frame may be divided into any number of frame regions, and in some embodiments, a complete frame may be considered as one single frame region. Each region may be of equal size or different sizes. In an embodiment, equal-sized regions are used for ease of comparison. In embodiments, a frame region corresponds to a processing tile.

In the present example, the determination of whether a frame region of the frame 820 is similar to a frame region of the frame 810 that has already been written is performed by comparing signatures representative of the content of the respective frame regions. In the example, an array of signatures 830 is generated for each processing tile of the frame 810 that is representative of the content of that tile, and an array of signatures 840 is generated for each processing tile of the frame 820 that is representative of the content of that tile. The signatures of the tiles that correspond to the region of the frame 820 being considered are then compared with the signatures of the tiles that correspond to the region of the frame 810.

In the embodiments, a frame region that is being considered corresponds to a tile. However, it may be the case that each frame region encompasses an area that comprises plural processing tiles. In this case, a frame region can have more than one content indicating signature associated with it. In an embodiment, when frame regions are being compared, the relevant content indicating signatures for each tile associated with the frame region in question are respectively compared with each other, and only if each respective pair of tile signatures are the same, is it determined that the frame regions are similar. Alternatively, multiple signatures corresponding to the multiple tiles of a frame region may be combined to generate a single signature for the frame region, or a single signature may be generated for a frame region that encompasses multiple tiles.

To facilitate this operation, one or more content indicating signatures are generated for each frame tile, and those content indicating signatures, as well as any other data representing the frame regions themselves, such as information relating to the processing performed on the frame region, are stored for use at a later stage. This data may be stored, for example, in the off chip memory 510. Other arrangements would, of course, be possible, if desired.

In an example, the process of generating the frame tile content indicating signatures may be performed by a signature generation hardware unit provided for or in the data processing system. The signature generation unit may be provided as an integral part of the camera ISP 501, 701, CPU 502, GPU 503, 703, video engine 504, 704, image processor 505, 705 and/or display controller 506, 706, as a separate hardware unit on- or off-chip, or in any other suitable form, and operates to generate for each frame tile a signature representative of the content of the frame tile. Multiple signature generation units may of course be provided for the data processing system if desired.

In the example, frame tile data is received by the signature generation unit, for example from the camera ISP 501, 701, CPU 502, GPU 503, 703, video engine 504, 704, image processor 505, 705 and/or display controller 506, 706 or other processor that is generating graphics or video frames, and the data is passed to a buffer, which temporarily stores the frame tile data while the signature generation process takes place, and to a signature generator. The signature generator operates to generate the necessary signature for the frame tile. In an example, the signature may be in the form of a 64 bit CRC for the frame tile. Other signature generation functions and other forms of signature such as hash functions, etc., could also or instead be used, if desired.

A write controller may be associated with the signature generation unit, which, once the signature for a frame region has been generated, operates to store the signature in a signature buffer that is associated with the frame in the off-chip memory 510, under the control of the write controller. The corresponding frame tile data is also stored in an appropriate buffer in the off-chip memory 510.

The comparison is performed for each frame region of frame 820. The writing of a frame region of frame 820 is only performed for frame regions that are determined not to be similar to frame regions of frame 810, as illustrated by frame 850.

Figure 9:
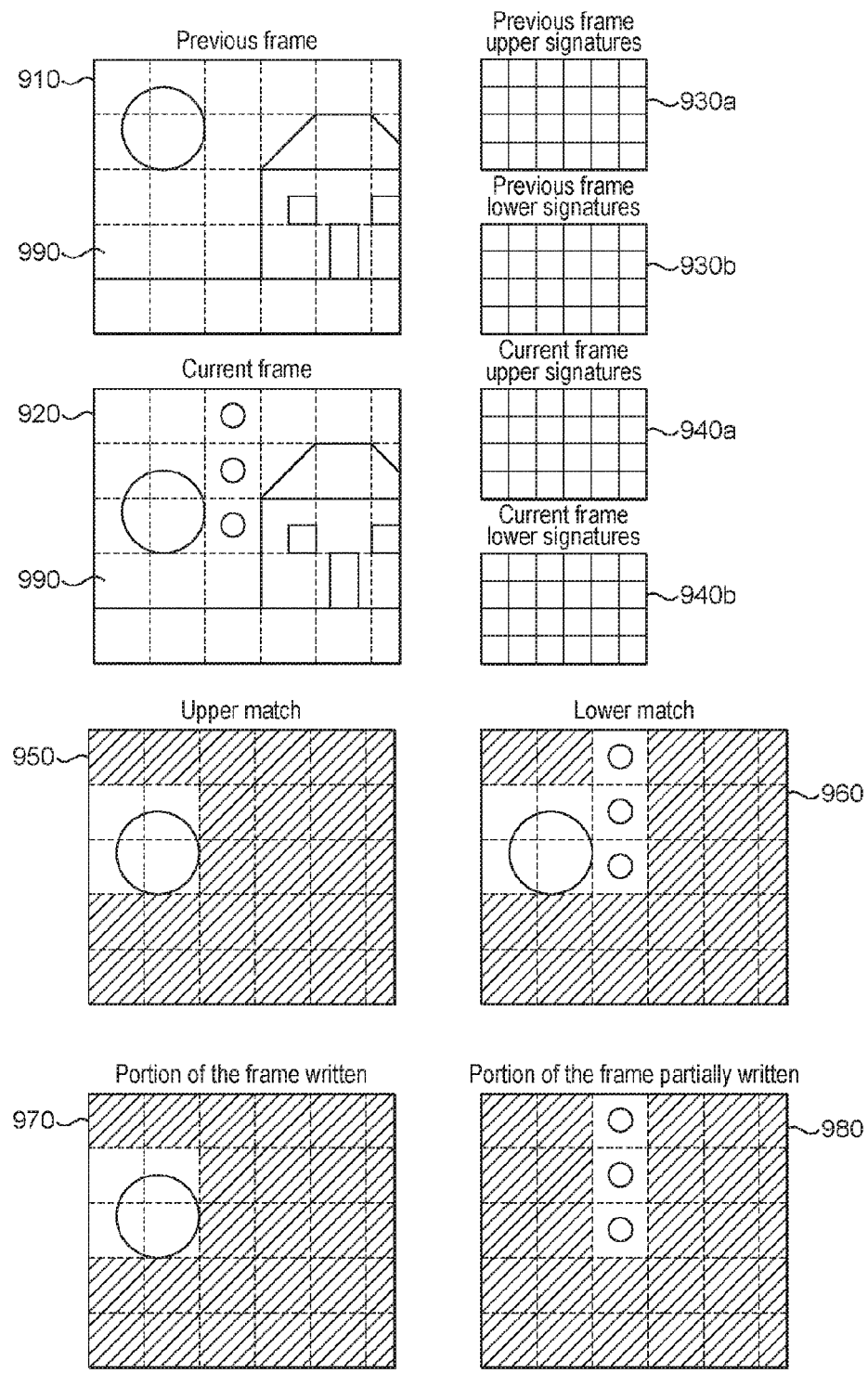
FIG. 9 shows an example of write operation according to an embodiment of the technology described herein.

In an embodiment of the technology described herein, the principle of write elimination is extended to comparing data portions of a frame region with data portions of another frame region, as illustrated in FIG. 9.

In the present embodiment, each frame region 990 again corresponds to a processing tile, and each is divided into plural data portions. Each data portion of a tile (frame region) here corresponds to a respective set of the bits of the data values for the sampling positions in the tile. Thus, a tile comprises a data portion of high-order bits (or MSB) and a data portion of low-order bits (or LSB). For example, for a 16×16 pixel tile that comprises 1024B, where the data values for each sampling position is stored in an ARGB 8888 format, each tile may, for example, comprise a data portion made up of the high-order bits (e.g. RGB[7:4]) of the data values for the sampling positions of the tile and a data portion made up of the low-order bits (e.g. RGB[3:0]) of the data values for the sampling positions of the tile.

Other arrangements of data portions are of course possible. For example, each frame region may comprise three or more data portions, e.g. RGB[7:5], RGB[4:2] and RGB[1:0].

In FIG. 9, previous frame 910 is a frame that has already been written to memory, while current frame 920 is a frame that is currently being written. In this example, an array of upper signatures 930a that is representative of the content of the high-order data portion of each tile and an array of lower signatures 930b that is representative of the content of the low-order data portion of each tile are generated for the previous frame 910. Similarly, an array of upper signatures 940a and an array of lower signatures are generated for the current frame 920.

The upper signature that corresponds to the high-order data portion of a current tile of the frame 920 that is being written is compared with the upper signature that corresponds to the high-order data portion of a corresponding tile of the previous frame 910 to determine if that data portion of the current tile is similar to that data portion of the corresponding previous frame tile.

In this embodiment, corresponding tiles are tiles that are at the same position within their respective frames. However, as explained above, in addition to comparing the current tile of the frame 920 with the corresponding tile of the frame 910, the comparison can moreover be performed between the current tile of the frame 920 and other tiles of the frame 910 so as to increase the likelihood of a match.

The result of the comparison is as shown in frame 950, in which a blacked-out tile represents a match between the upper signature of that tile in the frame 920 and the upper signature of the corresponding tile in the frame 910, and a tile showing the image of the frame 920 indicates there is no match between the upper signature of that tile in the frame 920 and the upper signature of the corresponding tile in the frame 910.

A similar approach may be applied to the low-order data portions of the tiles, in that the lower signature of the current tile may also be compared with the lower signature of the corresponding tile (and/or of any other tile) of the frame 910. However, noise and other small differences manifest in the low-order bits and so the low-order data portions are less likely to be similar to each other as compared to the high-order data portions. Thus, in embodiments, a comparison is only performed for the lower signature of a tile if the high-order data portion of the tile has been found to be similar to the high-order data portion of another tile. Thus, in the present embodiment, if the high-order data portion of the current tile is determined to be similar to the high-order data portion of the corresponding tile, the lower signature of the current tile is then compared with the lower signature of the corresponding tile.

The result of this comparison is as shown in frame 960, in which a blacked-out tile represents a match between the lower signature of that tile in the frame 920 and the lower signature of the corresponding tile in the frame 910, and a tile showing the image of the frame 920 indicates there is no match between the lower signature of that tile in the frame 920 and the lower signature of the corresponding tile in the frame 910.

As can be seen from the frame 950 and the frame 960, a tile in the current frame 920 can have a partial match with a corresponding tile in the frame 910. In the present example, four tiles are found to have no match for either their high-order data portions or their low-order data portions, and so the full tile data for each of these tiles is written to memory, as shown by frame 970. On the other hand, three tiles are found to have a match for their high-order data portions and no match for their low-order data portions, as shown by frame 980, and so for these tiles, only the tile data of the low-order data portions is written—the writing of the tile data of the high-order data portion is omitted.

Thus, according to the present embodiment, a partial match of a frame region is possible, and the data portion of the frame region in the current frame 920 determined to be similar to the corresponding data portion of a frame region in the previous frame 910, in this case the high-order data portion of a tile, need not be written to memory. It is therefore possible to reduce further bandwidth and memory usage in the data processing system.

Figure 10:
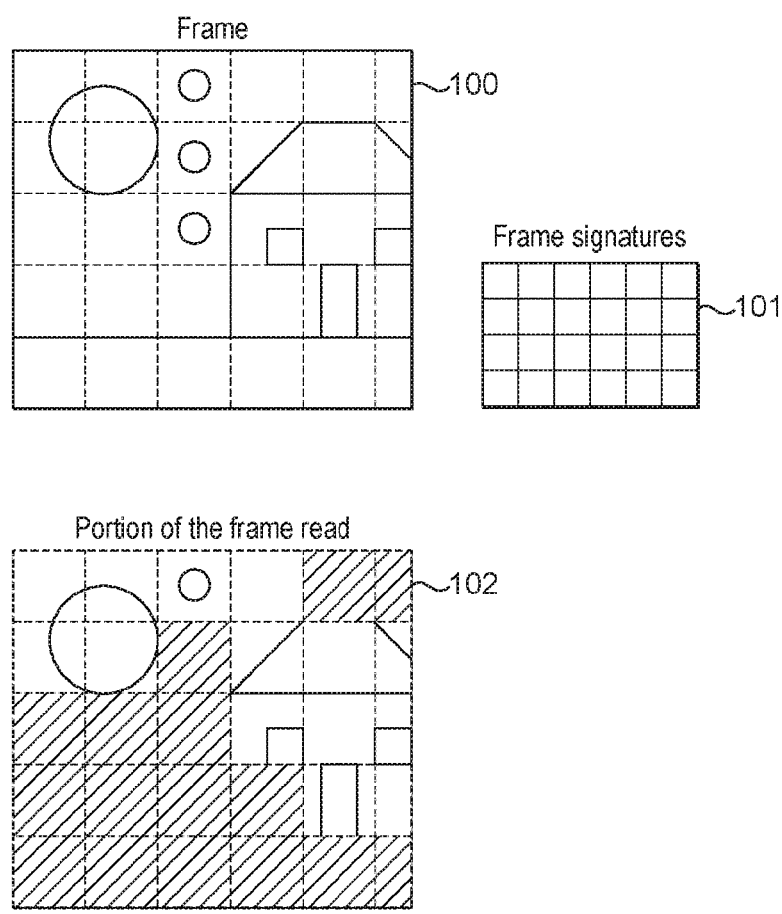
FIG. 10 shows an example of read transaction elimination.

FIG. 10 shows the principle of read elimination, in which a frame 100 is being read from memory, for example when it is being fetched for processing by one or more of the camera ISP 501, 701, GPU 503, 703, video engine 504, 704, image processor 505, 705 and display controller 506, 706.

In the example, the frame 100 is being fetched region by region. Here, a frame region corresponds to a processing tile. After a tile has been fetched, it is temporarily stored in a buffer, e.g. while awaiting processing. When the next tile is being fetched, a comparison can be performed between the current tile being fetched and one or more tiles that have already been fetched and stored in the buffer. The comparison determines if the current tile is similar to any of the tiles in the buffer. If it is determined that the current tile is similar to a tile already stored in the buffer (already fetched), the tile already stored in the buffer can be reused as the current tile and so the reading of the current tile from memory can be eliminated.

As in the examples of write operations, the comparison between two tiles can be performed by comparing a signature or signatures representative of the content the current tile against signatures representative of the content of one or more tiles in the buffer. Thus, the frame 100 in this example has an associated array of signatures 101 that respectively correspond to each tile of the frame 100. When a tile of the frame 100 is fetched from memory, the associated signature or signatures is/are also fetched, which is/are compared with the signature or signatures of a tile in the buffer.

Frame 102 shows an example of the tiles that need to be fetched from memory out of all the tiles of the frame 100.

As can be seen, the comparison and determination allow the reading of some of the tiles of the frame 100 to be eliminated.

Figure 11:
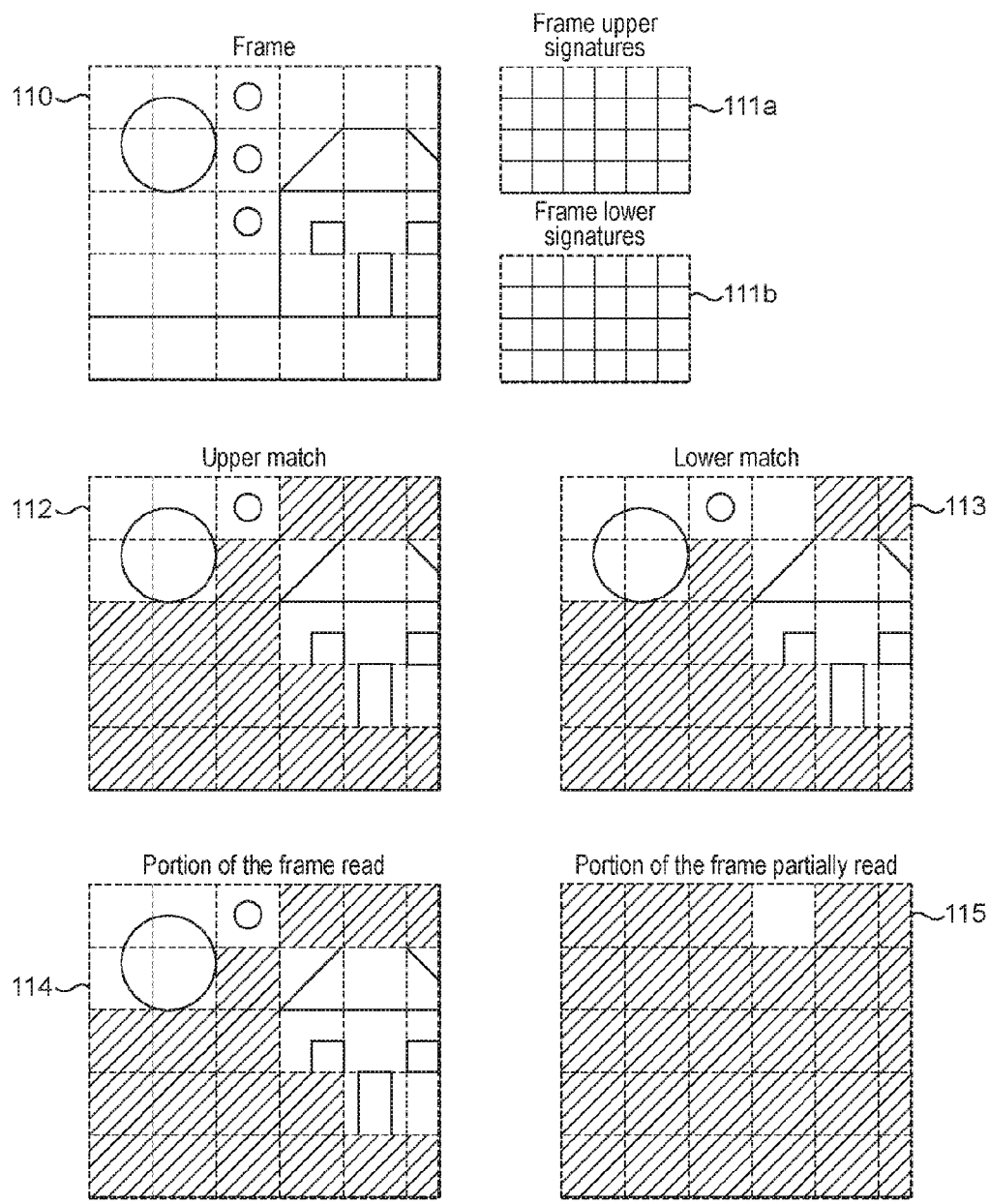
FIG. 11 shows an example of read operation according to an embodiment of the technology described herein.

In an embodiment of the technology described herein, the principle of read elimination is extended to comparing data portions of a frame region with data portions of another frame region, as illustrated in FIG. 11.

In the present embodiment, each frame region again corresponds to a processing tile, and each region is divided into data portions. In this example, again, a data portion of a tile (frame region) corresponds to a subset of the bits of the data values for the sampling positions in the tile, and a tile comprises a data portion of high-order bits (MSB) and a data portion of low-order bits (LSB).

Frame 110 shows the same image as the frame 100 in FIG. 10, and similar to the example of FIG. 10, an array of upper signatures 111a that is representative of the content of the high-order data portion of each tile and an array of lower signatures 111b that is representative of the content of the low-order data portion of each tile are generated for the frame 110.

When a tile of the frame 110 is being fetched, the upper signature that corresponds to the high-order data portion of that tile is compared with the upper signature that corresponds to the high order-data portion of a tile already fetched and stored in the buffer. The comparison can be performed between the current tile of the frame 110 being fetched and any other tiles of the frame 110 that have already been read. Moreover, the comparison may be performed between the current tile of the frame 110 and tiles of a frame that has previously been read, provided the previous frame is stored in the buffer, so as to increase the likelihood of a match. The result of the comparison is illustrated by frame 112, in which a blacked-out tile represents a match between the upper signature of that tile and the upper signature of a tile in the buffer, and a tile showing the image of the frame 110 indicates there is no match found for that tile.

If it is determined that the high-order data portion of the current tile is similar to the high-order data portion of a previous tile in the buffer, the lower signature of the current tile is then compared with the lower signature of the previous tile. The result of the comparison is illustrated by frame 113, in which a blacked-out tile represents a match between the lower signature of that tile and the lower signature of the previous tile in the buffer, and a tile showing the image of the frame 110 indicates there is no match.

As can be seen from the frame 112 and the frame 113, a tile can have a partial match with a previous tile in the buffer. In the present example, thirteen tiles are found to have no match for either their high-order data portions or their low-order data portions, and so the full tile data for each of these tiles is read from memory, as shown by frame 114. On the other hand, one tile is found to have a match for its high-order data portion and no match for its low-order data portion, as shown by frame 115, and so for these tiles, only the tile data of the low-order data portion is read, while the reading of the tile data of the high-order data portion is omitted.

Thus, the present embodiment allows a partial match of a frame region, such that the data portion of the frame region in the frame 110 determined to be a previously read frame region portion, in this case the high-order data portion of a tile, need not be read from memory.

The present embodiments allow both full and partial elimination, in that a write transaction or a read transaction can be fully eliminated when the current frame region is determined to be similar to a previous frame region, and moreover, even when only a data portion of the current frame region is determined to be similar to the corresponding data portion of a previous frame region, the write or read transaction of that data portion can be eliminated. Compared to transaction elimination methods in which only full elimination is possible, the present embodiments enable further reduction of bandwidth and memory usage in the data processing system.

Figure 12:
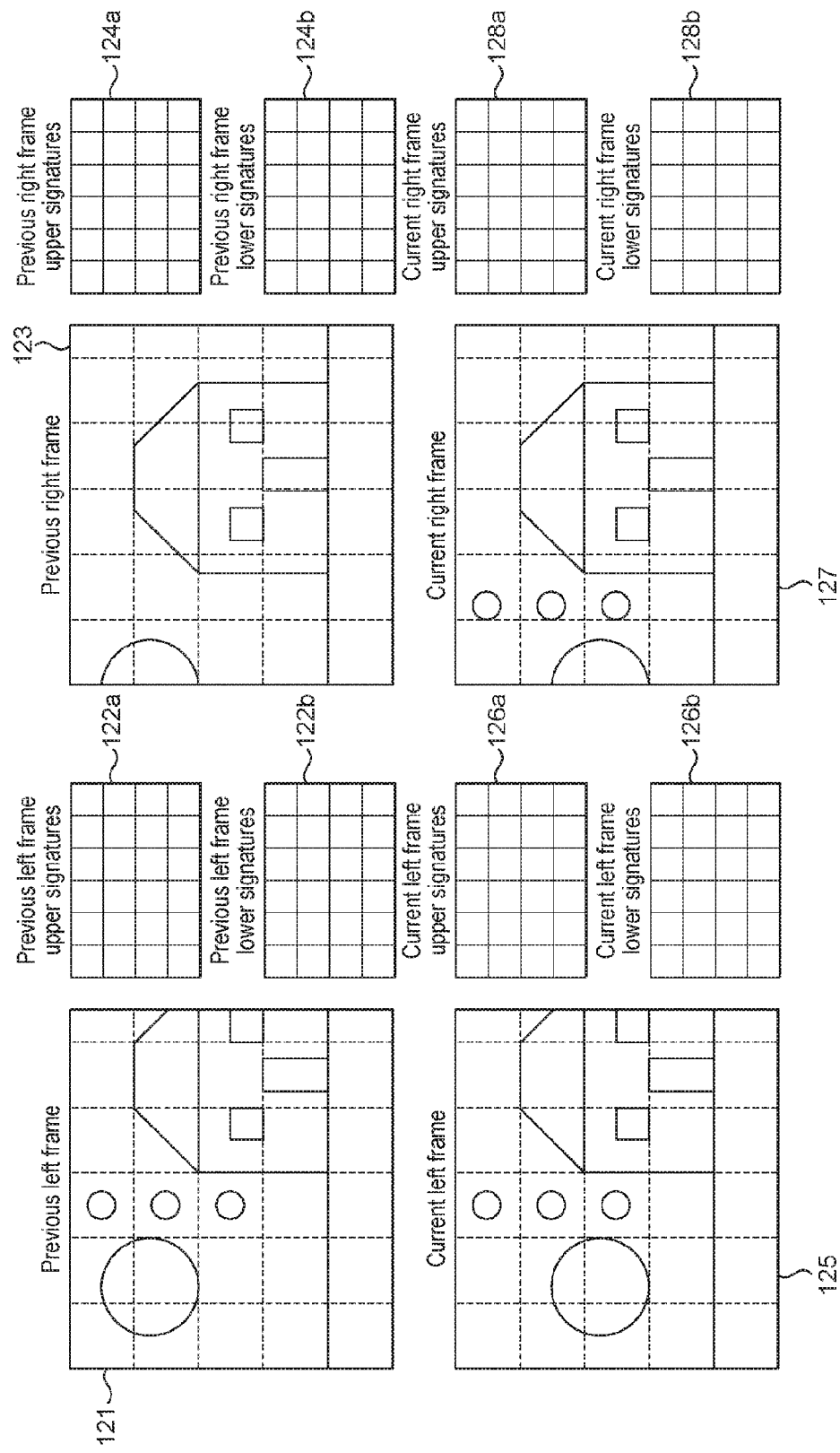
FIG. 12 shows an example of writing a stereoscopic 3D image according to an implementation example of the embodiments.

An implementation example of the embodiments is shown in FIG. 12. The example shows two sets of stereoscopic images, including a previous stereoscopic image comprising a previous left frame 121 and a previous right frame 123, and a current stereoscopic image comprising a current left frame 125 and a current right frame 127. The previous frames are frames for which a memory access operation, i.e. a write operation or a read operation, has already been performed, while the current frames are frames for which a memory access operation is being performed. Each frame comprises a plurality of frame regions, where a frame region corresponds to a processing tile in this example. Each tile comprises a plurality of data portions, where in this example, a data portion corresponds to a subset of the bits of the data values for the sampling positions in that tile. In this example, each tile comprises a high-order data portion containing the high-order bits (MSB) of the data values in that tile and a low-order data portion containing the low-order bits (LSB) of the data values in that tile.

An array of upper signatures 122a each representative of the content of the high-order data portion of a respective tile, and an array of lower signatures 122b each representative of the content of the low-order data portion of a respective tile are generated for the previous left frame 121. Similarly, an array of upper signatures 124a and an array of lower signatures 124b are generated for the previous right frame 123, an array of upper signatures 126a and an array of lower signatures 126b are generated for the current left frame 125, and an array of upper signatures 128a and an array of lower signatures 128b are generated for the current right frame 127.

As explained above, when a current tile is being written, the upper signature of the current tile can be compared with the upper signature of any other tile that has previously been written to memory. Thus, in the present example, the upper signature of a current tile in the current left frame can be compared with the upper signature of a tile in the previous left frame, of a tile in the previous right frame, or of a tile in the current right frame (that has already been written to the memory). If the high-order data portion of the current tile is determined to be similar to the high-order data portion of a previous tile that has already been written, the write operation of the high-order data portion of the current tile can be omitted.

Then, the lower signature of the current tile is compared with the lower signature of the matching previous tile. If the low-order data portion of the current tile is determined to also be similar to the low-order data portion of the matching previous tile, the write operation of the low-order data portion of the current tile can also be omitted. However, even if the low-order data portion of the current tile is determined not to be similar to the low-order data portion of the matching previous tile, the write transaction of the current tile can still be partially eliminated by writing only the low-order data portion of the current tile to memory.

In practice, it may not be desirable to compare a data portion of a current tile with the corresponding data portion of all available previous tiles, as the increase in the time it takes to write or read the tile and in the amount of processing required may outweigh the benefit of the overall reduction in the bandwidth and memory requirement. Thus, in some embodiments, only a data portion of a current tile in a current frame (e.g. the current right frame 127) is compared with the corresponding data portion of a corresponding tile in a previous frame (e.g. the previous left frame 121, the previous right frame 123, and/or the current left frame 125 if it has already been written). In the present example, if a tile of the current right frame 127 is compared with a corresponding tile of the previous right frame 123, the corresponding tile is a tile that is at the same position in the previous right frame 123 with respect to the position of the tile in the current right frame 127. In the case of comparing the tile of the current right frame 127 with a corresponding tile of the previous left frame 121 or the current left frame 125, the corresponding tile is a tile that is at a position in the left frame that is shifted horizontally by an interocular distance with respect to the position of the tile in the current right frame 127. The shifting of the tile position ensures real correspondence between the tiles and thus increases the likelihood of a match between data portions of a tile in a left frame and data portions of a tile in a right frame.

Similar principles apply when a current tile is being read from memory, and so a detailed description will not be repeated here.

Figure 13:
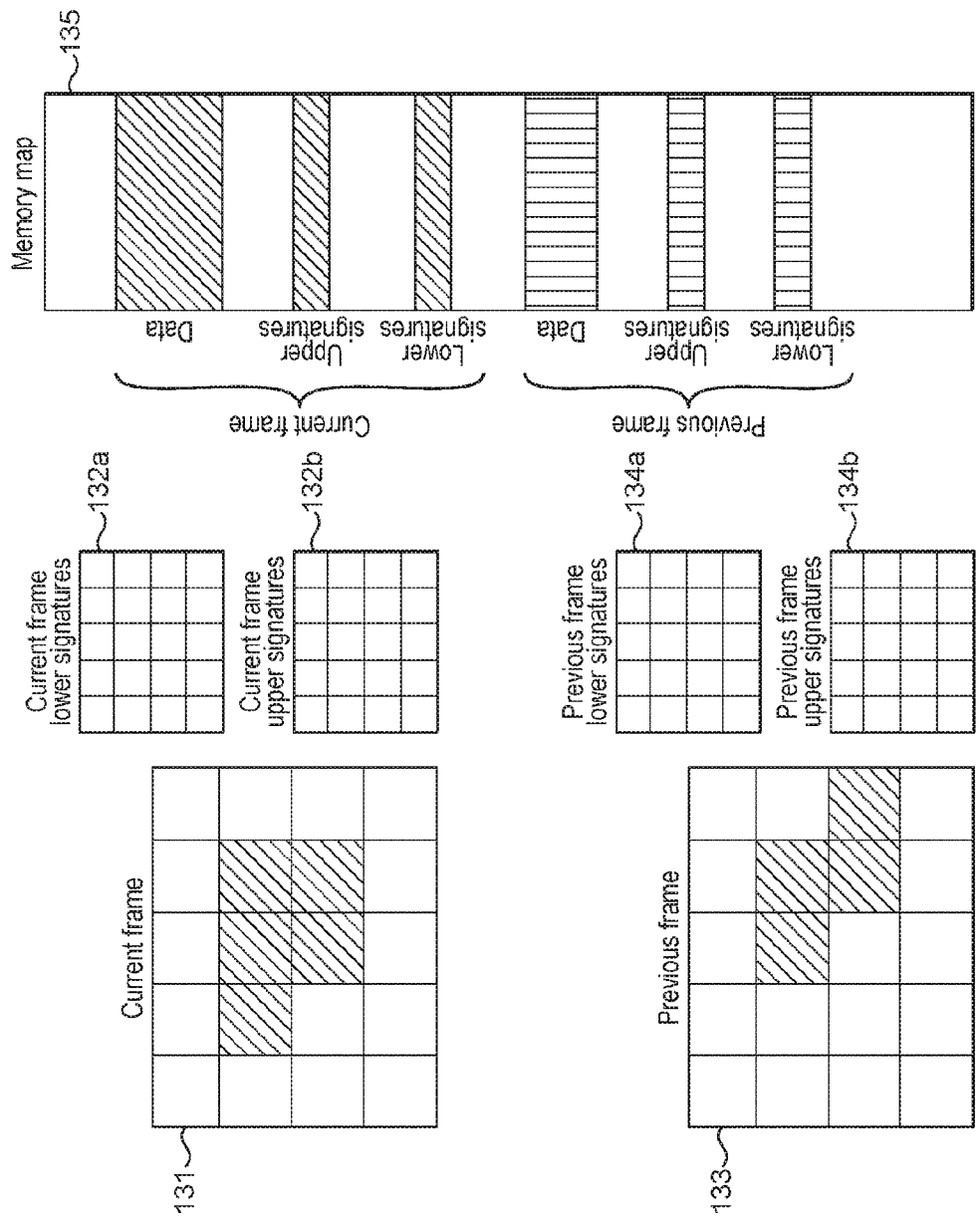
FIG. 13 illustrates an example memory layout used in the embodiments.

An example of the memory layout that can be implemented in the embodiments is shown in FIG. 13. A current frame 131 and a previous frame 133 each comprises a plurality of frame regions. An array of lower signatures 132*a* and an array of upper signatures 132*b* are respectively generated for the low-order data portions and the high-order data portions of the tiles of the current frame 131, and an array of lower signatures 134*a* and an array of upper signatures 134*b* are respectively generated for the low-order data portions and the high-order data portions of the tiles of the previous frame 133. The lower and upper signatures and the tile data of the respective frames are stored in memory as shown in memory map 135.

The frames may be stored in the data processing system, e.g. in an off-chip memory, in any suitable or desirable manner.

In one embodiment, the respective data portions of each frame region are stored separately, i.e. a frame is stored such that each frame region of the frame is stored as a separate data portion, e.g. a high-order data portion comprising the MSB of the frame region and a low-order data portion comprising the LSB of the frame region. This way of storing frame regions of a frame facilitates the comparison and reusing of a data portion of a frame region.

Figure 14:
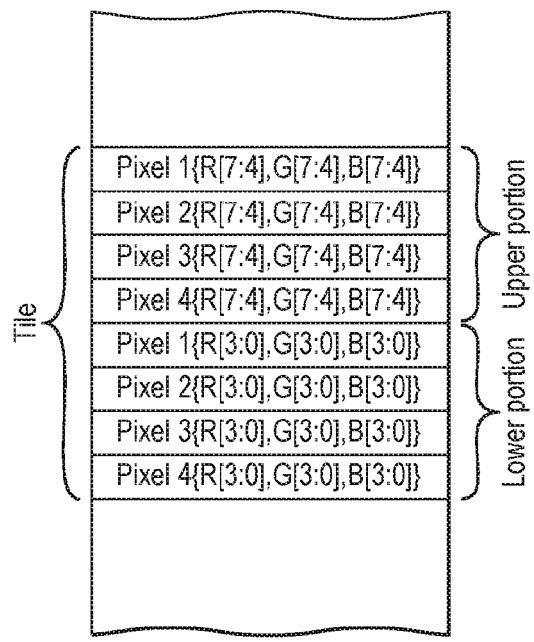
FIG. 14 shows an example memory layout used in the embodiments.

An example is shown in FIG. 14, in which pixels 1, 2, 3 and 4 of a tile are separated into a low-order data portion RGB[3:0] and a high-order data portion RGB[7:4]. Here, the low-order data portion of the tile is stored together in memory, as is the high-order data portion of the tile.

Figure 15:
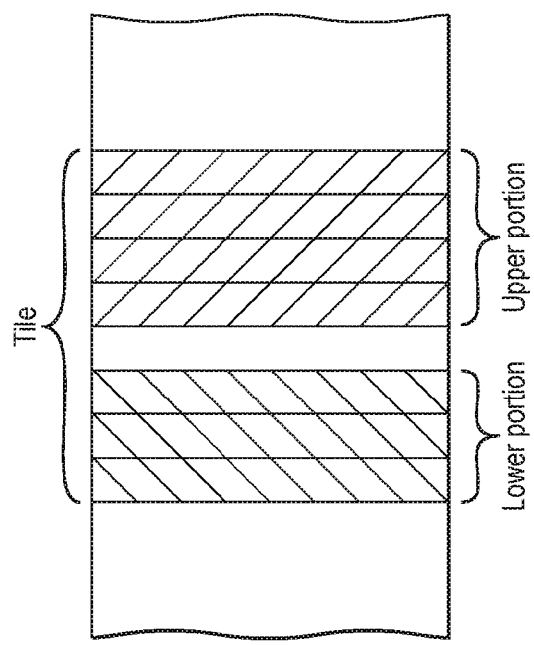
FIG. 15 shows another example memory layout used in the embodiments.

In an example where compression is performed on a frame, for each tile of the frame, the low-order data portion and the high-order data portion may be compressed separately and stored separately as shown in FIG. 15.

The separately compressed high-order data portion and low-order data portion of a tile can then be subjected to comparison with a previous tile for the purpose of eliminating a memory access operation as described above. In particular, signatures representative of the content of the respective data portions are generated before compression, and the signatures of corresponding data portions are compared to determine if they are similar. If the high-order data portion of a current tile is determined to be similar to the high-order data portion of a previous tile, while the low-order data portion of the current tile is determined not to be similar to the low-order data portion of the previous tile, only the low-order data portion of the current tile is written while the writing of the compressed high-order data portion of the current tile can be omitted.

In this example, the low-order data portion of the current tile is in an embodiment written together with metadata indicating that the full tile is generating by decompressing the low-order data portion of the current tile and combining it with the decompressed high-order data portion of the previous tile.

Where the high-order data portion and the low-order data portion of a tile are compressed separately, when compressing the high-order data portion, the data is in an embodiment shifted to the lower nibbles of the compressor as it improves the compression ratio. When the data portions are decompressed, the data should be (and is in an embodiment) shifted back to its original position.

Alternatively or additionally, if the frame has been compressed using a compression scheme that allows compression and decompression of separate data portions for a frame region (e.g. using the data compression scheme described in the Applicant's U.S. Pat. No. 8,542,939), such that compression or decompression of the frame region may be performed respectively to compress or to extract a data portion for (but not all of) the frame region, then, when it is determined that one or more data portions for a current frame region (e.g. the high-order data portion) is/are similar to corresponding one or more data portions of a previous frame region, the memory access operation only needs to be performed to write or read the compressed data portion or portions of the current frame region that correspond(s) to the data portion or portions determined not to be similar to a corresponding data portion or portions of the previous frame region (e.g. the low-order data portion).

In this example, the, e.g. low-order, data portion of the current frame region on which the partial memory access operation is performed is written to memory together with metadata indicating that any other data portion (e.g. the high-order data portion) for the frame region that the memory access operation has not been performed for corresponds to the respective (e.g. high-order) data portion of a previous frame region. Thus, when required, the complete current frame region may be formed by decompressing the previous frame region and using the, e.g. high-order, data portion thereof and combining it with the decompressed low-order, e.g. data portion of the current frame region.

Figure 16:
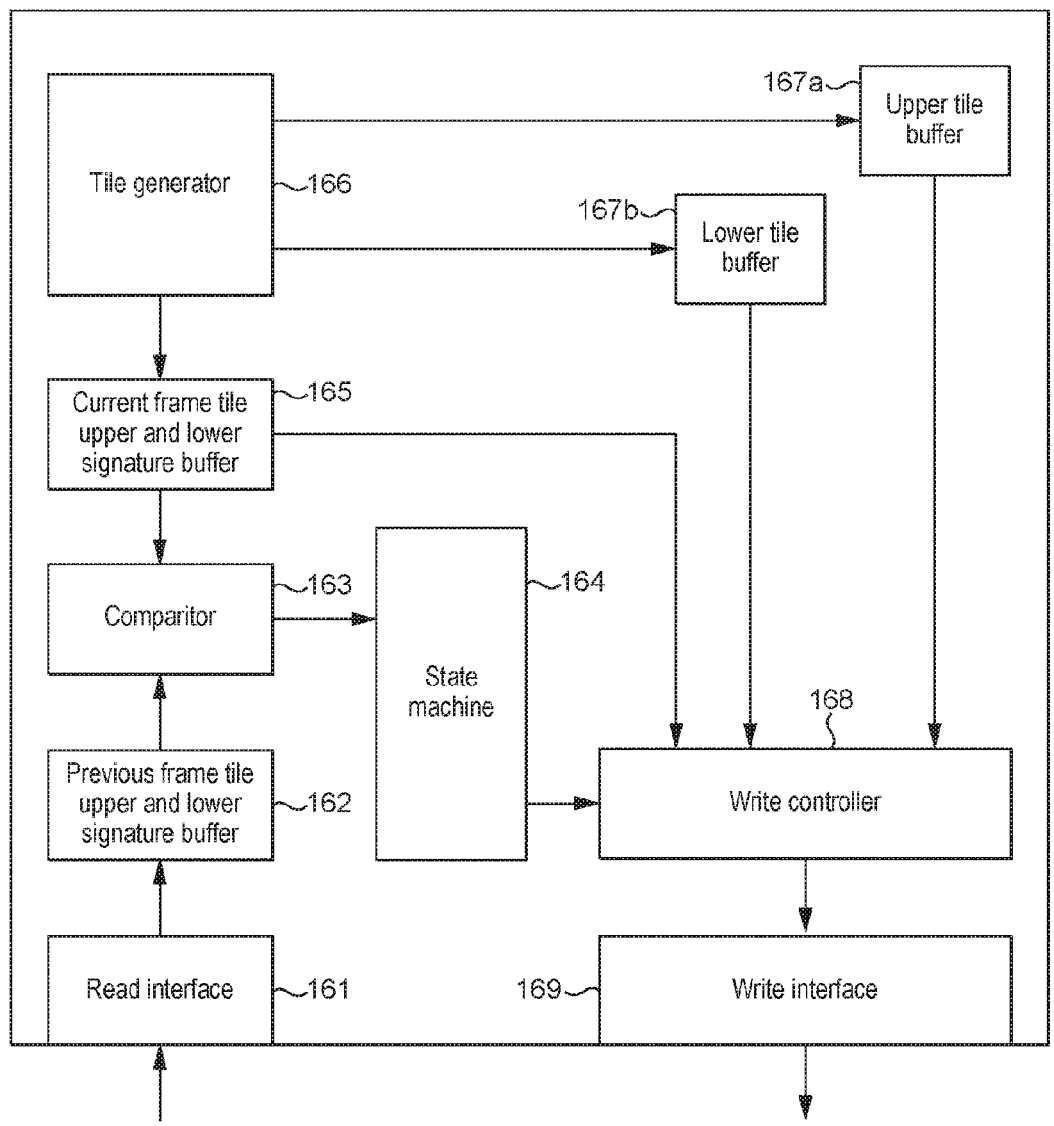
FIG. 16 is a functional block diagram illustrating frame writing used in the embodiments of the technology described herein.

A functional block diagram illustrating an example of write transaction elimination according to embodiments of the technology described herein is shown in FIG. 16. The upper and lower signatures of a previous tile are fetched and temporarily stored in buffer 162 via read interface 161, while tile generator 166 generates a new tile together with an upper signature and a lower signature respectively for the high-order data portion and the low-order data portion of the new tile. The tile generator temporarily stores the upper and lower signatures of the new tile in the buffer 165, the high-order data portion of the new tile in the buffer 167*a* and the low-order data portion of the new tile in the buffer 167*b*.

The comparator 163 compares the upper signature of the new tile with the upper signature of the previous tile and compares the lower signature of the new tile with the lower signature of the previous tile, and forwards the result of the comparison to state machine 164. The state machine 164 outputs the comparison result to write controller 168.

Based on the comparison result, the write controller 168 writes both the high-order and low-order data portions of the new tile to memory via write interface 169 if the comparison result indicates that the upper and lower signatures of the new tile do not respectively match the upper and lower signatures of the previous tile, or writes only the low-order data portion of the new tile if the upper signature of the new tile matches the upper signature of the previous tile while the lower signatures do not match, or does not write either the high-order data portion or the low-order data portion of the new tile if both the upper and lower signatures match. The write controller 168 moreover writes the upper and lower signatures of the new tile together with the respective high-order and low-order data portions of the new tile. In some embodiments, it may be possible or desirable to allow the writing of only the high-order data portion of the new tile if the lower signature of the new tile matches the lower signature of the previous tile while the upper signatures do not match.

Figure 17:
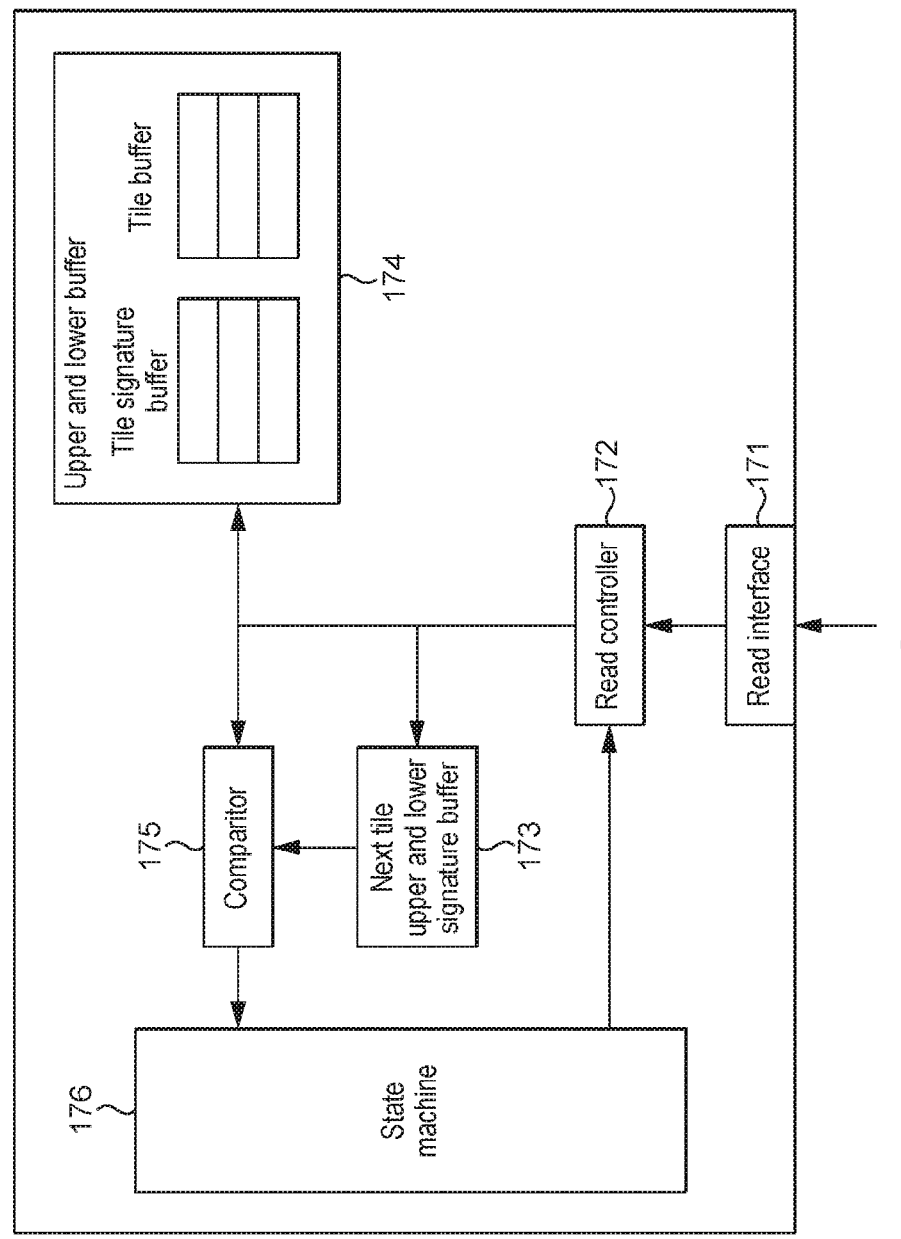
FIG. 17 is a functional block diagram illustrating frame reading used in the embodiments of the technology described herein.

An example of read transaction elimination according to embodiments of the technology described herein is illustrated in the functional block diagram of FIG. 17. Read controller 172 fetches the upper signature and the lower signature of the current tile to be read via read interface 171, and temporarily stores the signatures in the buffer 173. Comparator 175 fetches the upper and lower signatures of a previous tile from the buffer 174, which stores tiles that have already been read and the upper and lower signatures for their respective high-order and low-order data portions, and compares the upper and lower signatures of the current tile respectively with the upper and lower signatures of the previous tile. The comparator 175 outputs the comparison result to state machine 176.

Based on the comparison result from the state machine 176, the read controller 172 reads both the high-order and low-order data portions of the new tile from memory via read interface 171 and stores them in the buffer 174 if the comparison result indicates that the upper and lower signatures of the current tile do not respectively match the upper and lower signatures of the previous tile, or reads only the low-order data portion of the current tile if the upper signature of the current tile matches the upper signature of the previous tile while the lower signatures do not match, or does not read either the high-order data portion or the low-order data portion of the current tile if both the upper and lower signatures match. In some embodiments, it may be possible or desirable to allow the reading of only the high-order data portion of the new tile if the lower signature of the new tile matches the lower signature of the previous tile while the upper signatures do not match.

Figure 18:
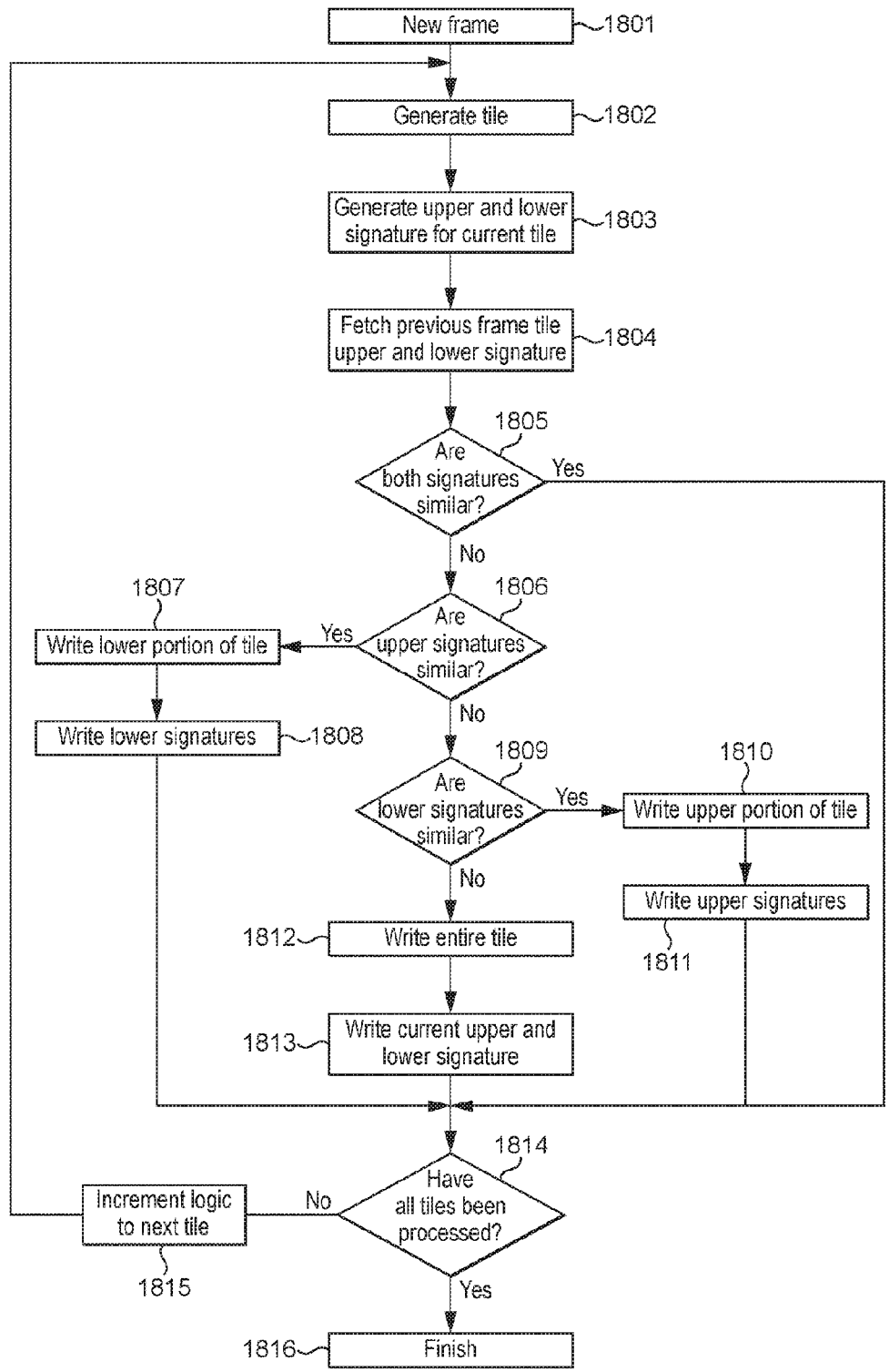
FIG. 18 is a flow diagram of the processing to write a frame according to an embodiment of the technology described herein.

FIG. 18 shows a flow diagram of a method of processing a frame in a data processing system that generates an output frame for display according to an embodiment of the technology described herein. In particular, the flow diagram illustrates the processing of a frame when it is to be written to memory.

At step 1801, a new frame is to be written. A frame is processed on a region by region basis, and in the example, a frame region corresponds to a processing tile. Thus, at step 1802, a current tile is generated. According to the embodiment, a tile comprises a plurality of data portions. In the example, a data portion corresponds to a number of bits of the data values in the tile, where a high-order data portion comprises the MSB of the data values and a low-order data portion comprises the LSB of the data values. At step 1803, an upper signature is generated for the high-order data portion of the tile and a lower signature is generated for the low-order data portion of the tile, based on the content of the respective data portions of the tile.

At step 1804, the upper signature and the lower signature of a previous tile are fetched, which are representative of the content respectively of the high-order data portion and the low-order data portion of the previous tile. As explained above, the previous tile can be a tile in the same frame as the current tile at a different position that has already been written, or a tile from a frame that has previously been written. In an embodiment, the previous tile is a corresponding tile in a previous frame (e.g. at the same or corresponding position in the frame as the current tile). The upper signature and lower signature of the current tile are then compared respectively with the upper signature and lower signature of the previous tile at step 1805.

If both the upper signature and the lower signature of the current tile respectively match the upper signature and the lower signature of the previous tile, both the high-order data portion and the low-order data portion of the current tile are respectively determined to be similar to the high-order data portion and the low-order data portion of the previous tile. Thus the writing of both the high-order data portion and the low-order data portion of the current tile is omitted. The method then proceeds to step 1814 to check whether all tiles of the current frame have been processed. If so, the processing of the current frame ends at step 1816. If not, the method proceeds to increment the logic to the next tile in the current frame at step 1815, and returns to step 1802 where the next tile is generated.

At step 1806, if only the upper signature of the current tile matches the upper signature of the previous tile, the writing of the high-order data portion of the current tile is omitted. At step 1807, the low-order data portion of the current tile is written, and at step 1908, the lower signature of the current tile is written. The method then proceeds to step 1814 to check whether all tiles of the current frame have been processed.

At step 1809, if only the lower signature of the current tile matches the lower signature of the previous tile, the writing of the low-order data portion of the current tile is omitted. At step 1810, the high-order data portion of the current tile is written, and at step 1811, the upper signature of the current tile is written. The method then proceeds to step 1814 to check whether all tiles of the current frame have been processed.

If neither one of the upper signature nor the lower signature of the current tile matches the upper signature and the lower signature of the previous tile, the method proceeds to write both data portions of the current tile at step 1812, and to write the upper and lower signatures of the current tile at step 1813. The method again proceeds to step 1814 to check whether all tiles of the current frame have been processed. If so, the processing of the current frame ends at step 1816.

Figure 19:
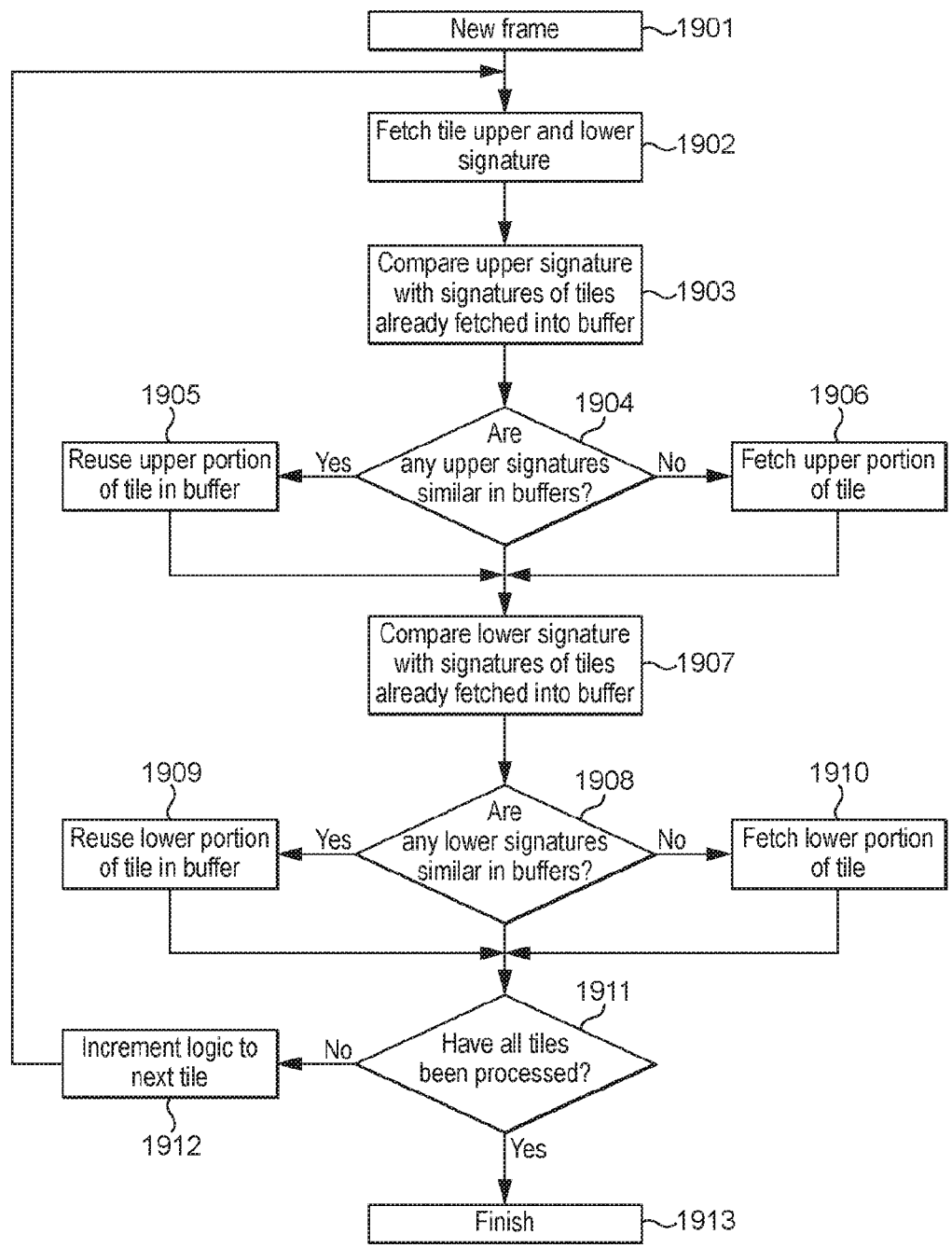
FIG. 19 is a flow diagram of the processing to read a frame according to an embodiment of the technology described herein.

FIG. 19 shows a flow diagram of a method of processing a frame in a data processing system so as to read a frame memory.

At step 1901, a new frame is to be read. In the example, a data portion again corresponds to a number (subset) of the bits of the data values for the tile, where a high-order data portion comprises the MSB of the data values and a low-order data portion comprises the LSB of the data values. At step 1902, the upper signature and the lower signature of a current tile to be read are fetched.

The upper signature of the current tile, which is representative of the content of the high-order data portion of the current tile, is compared, at step 1903, with the respective upper signature of one or more previous tiles that have already been fetched from memory and stored in a buffer, so as to determine whether the high-order data portion of the current tile is similar to the high-order data portion of any of the one or more previous tiles.

At step 1904, if it is determined that the upper signature of the current tile matches the upper signature of a tile in the buffer, the high-order data portion of the tile in the buffer is reused, at step 1905, as the high-order data portion of the current tile, and the reading of the high-order data portion of the current tile is omitted. If it is determined that the upper signature of the current tile does not match the upper signature of any of the tiles in the buffer, then at step 1906, the high-order data portion of the current tile is fetched from memory and stored in the buffer.

The lower signature of the current tile, which is representative of the content of the low-order data portion of the current tile, is compared, at step 1907, with the respective lower signatures of one or more previous tiles that have already been fetched from memory and stored in a buffer, so as to determine whether the low-order data portion of the current tile is similar to the low-order data portion of any of the one or more previous tiles.

At step 1908, if it is determined that the lower signature of the current tile matches the lower signature of a tile in the buffer, the low-order data portion of the tile in the buffer is reused, at step 1909, as the low-order data portion of the current tile, and the reading of the low-order data portion of the current tile is omitted. If it is determined that the lower signature of the current tile does not match the lower signature of any of the tiles in the buffer, then at step 1910, the low-order data portion of the current tile is fetched from memory and stored in the buffer.

The method then proceeds to step 1911 to check whether all tiles of the current frame have been processed. If not, the method proceeds to increment the logic to the next tile in the current frame at step 1912, and returns to step 1902 where the upper and lower signatures of the next tile are fetched. If so, the processing of the current frame ends at step 1913.

As will be appreciated from the above, the technology described herein, in its embodiments at least, is capable of providing a mechanism for reducing the amount of memory access operations (read/write transactions) required in a data (image) processing system when processing a frame, e.g. to provide it for display, compared to known, conventional processing techniques. It is therefore possible to reduce bandwidth and memory requirements e.g. when processing image or video content.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical application, to thereby enable others skilled in the art to best utilise the technology described herein in various embodiments and with various modifications as are suited to the particular use contemplated. It is intended that the scope of the technology described herein be defined by the claims appended hereto.

What is claimed is:

1. A method of processing a frame in a data processing system, the frame comprising one or more frame regions that together form the frame, each frame region being represented as one or more data values, with each data value being represented by a set of bits, the method comprising: for at least one region of the frame, when a memory access operation is to be performed for the region of the frame:

comparing only a portion of the data representing data values for the frame region with only a corresponding portion of the data representing the corresponding data values for a previous frame region, which is a frame region for which the memory access operation has been performed, to determine whether the data portion for the frame region is similar to the corresponding data portion for the previous frame region, wherein each data portion for a frame region comprises, for each data value for the frame region, a subset of bits from the set of bits representing the data value; and omitting the memory access operation for only the data portion for the frame region when it is determined to be similar to the corresponding data portion for the previous frame region; or performing the memory access operation for only the data portion for the frame region when it is determined not to be similar to the corresponding data portion for the previous frame region.

2. The method according to claim 1, wherein the memory access operation is a read operation.

3. The method according to claim 1, wherein the memory access operation is a write operation.

4. The method according to claim 1, comprising:
when the memory access operation is omitted for the data portion of the frame region, using the corresponding data portion of the previous frame region in place of the data portion of the frame region.

5. The method according to claim 1, further comprising, when it is determined that the data portion of the frame region is similar to a corresponding data portion of a previous frame region, storing information identifying the corresponding data portion of the previous frame region.

6. The method according to claim 1, wherein the frame regions are divided into a plurality of separate data portions, and the data portions for each frame region are stored such that they can be read and written separately to each other.

7. The method according to claim 1, further comprising:
comparing all of the data representing the data values for the frame region with all of the data representing the corresponding data values for a previous frame region, which is a frame region for which the memory access operation has been performed, to determine whether all of the data representing the data values for the frame region is similar to all of the data representing the data values for the previous frame region; and
omitting the memory access operation for all of the data representing the data values for the frame region when it is determined to be similar to all of the data representing the data values for the previous frame region.

8. The method according to claim 1, wherein the current frame region and the previous frame region are regions of the same frame located at different positions of the frame.

9. The method according to claim 1, wherein the current frame region is a frame region of a current frame for which the memory access operation is to be performed, and the previous frame region is a frame region of a previous frame for which the memory access operation has been performed.

10. The method according to claim 9, wherein the current frame and the previous frame are a pair of frames that combine to form a stereoscopic image, and wherein the previous frame region being compared with the current frame region is a frame region in the previous frame that is at a position shifted by an interocular distance with respect to the position of the current frame region in the current frame.

11. The method according to claim 1, wherein each frame region corresponds to a processing tile.

12. The method according to claim 1, wherein each data portion of a frame region comprises a selected set of the most significant bits, or of the least significant bits, of each data value of the data values for the frame region.

13. The method according to claim 1, wherein the comparing each data portion of the frame region with a corresponding data portion of a previous frame region comprises comparing a signature representative of the content of the data portion of the frame region with a signature representative of the content of the corresponding data portion of the previous frame region.

14. An apparatus for processing a frame in a data processing system, the frame comprising one or more frame regions that together form the frame, and each frame region being represented as one or more data values, with each data value being represented by a set of bits; the apparatus comprising:
    comparing circuitry capable of, when a memory access operation is to be performed for a region of a frame:
        comparing only a portion of the data representing data values for the frame region, with only a corresponding portion of the data representing the corresponding data values for a previous frame region, which is a frame region for which the memory access operation has been performed, to determine whether the data portion for the frame region is similar to the corresponding data portion for the previous frame region, wherein each data portion for a frame region comprises, for each data value for the frame region, a subset of bits from the set of bits representing the data value; and
    memory accessing circuitry capable of:
        omitting the memory access operation for only the data portion for the frame region when it is determined, by the comparing circuitry, to be similar to the corresponding data portion for the previous frame region; or
        performing the memory access operation for only the data portion for the frame region when it is determined, by the comparing circuitry, not to be similar to the corresponding data portion for the previous frame region.

15. The apparatus according to claim 14, wherein the memory accessing circuitry is capable of:
    when the memory access operation is omitted for the data portion of the frame region, using the corresponding data portion of the previous frame region in place of the data portion of the frame region.

16. The apparatus according to claim 14, wherein the memory accessing circuitry is further capable of, when it is determined that the data portion of the frame region is similar to a corresponding data portion of a previous frame region, storing information identifying the corresponding data portion of the previous frame region.

17. The apparatus according to claim 14, wherein the frame regions are divided into a plurality of separate data portions, and the data portions for each frame region are stored such that they can be read and written separately to each other.

18. The apparatus according to claim 14, wherein the current frame region is a frame region of a current frame for which the memory access operation is to be performed, and the previous frame region is a frame region of a previous frame for which the memory access operation has been performed.

19. The apparatus according to claim 18, wherein the current frame and the previous frame are a pair of frames that combine to form a stereoscopic image; and
    wherein the comparing circuitry is configured to compare the current frame region with a frame region in the previous frame that is at a position shifted by an interocular distance with respect to the position of the current frame region in the current frame.

20. A non-transitory computer readable medium storing a computer program comprising computer software code for performing a method, when the program is run on a data processing system, of processing a frame in the data processing system, the frame comprising one or more frame regions that together form the frame, each frame region being represented as one or more data values, with each data value being represented by a set of bits, the method comprising:
    for at least one region of the frame, when a memory access operation is to be performed for the region of the frame:
        comparing only a portion of the data representing data values for the frame region with only a corresponding portion of the data representing the corresponding data values for a previous frame region, which is a frame region for which the memory access operation has been performed, to determine whether the data portion for the frame region is similar to the corresponding data portion of the previous frame region, wherein each data portion for a frame region comprises, for each data value for the frame region, a subset of bits from the set of bits representing the data value; and
    omitting the memory access operation for only the data portion for the frame region when it is determined to be similar to the corresponding data portion for the previous frame region; or
    performing the memory access operation for only the data portion for the frame region when it is determined not to be similar to the corresponding data portion for the previous frame region.

* * * * *